United States Patent
Sakoh et al.

(10) Patent No.: US 7,853,704 B2
(45) Date of Patent: Dec. 14, 2010

(54) CONTENT ACQUISITION METHOD

(75) Inventors: Noriyuki Sakoh, Kanagawa (JP);
Takeshi Iwatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 334 days.

(21) Appl. No.: 10/564,414

(22) PCT Filed: May 19, 2004

(86) PCT No.: PCT/JP2004/007116

§ 371 (c)(1),
(2), (4) Date: Jan. 12, 2006

(87) PCT Pub. No.: WO2005/033957

PCT Pub. Date: Apr. 14, 2005

(65) Prior Publication Data
US 2007/0106745 A1    May 10, 2007

(30) Foreign Application Priority Data
Sep. 30, 2003  (JP) ............................. 2003-339137

(51) Int. Cl.
G06F 15/16 (2006.01)
G06F 15/173 (2006.01)
G06F 21/00 (2006.01)
G06K 5/00 (2006.01)

(52) U.S. Cl. ...................... 709/229; 709/217; 709/225; 713/182; 235/382

(58) Field of Classification Search .................... None
See application file for complete search history.

(56) References Cited

U.S. PATENT DOCUMENTS 6,275,936 B1 *  8/2001  Kyojima et al. ............. 713/182
6,592,032 B1 *  7/2003  Takaragi et al. ............. 235/382
7,228,556 B2 *  6/2007  Beach et al. .................. 725/53

(Continued)

FOREIGN PATENT DOCUMENTS

JP    11-073360    3/1999

(Continued)

OTHER PUBLICATIONS

U.S. Appl. No. 10/526,902, filed Aug. 16, 2005, Yamashita et al.

(Continued)

*Primary Examiner*—Ario Etienne
*Assistant Examiner*—Ho Shiu
(74) *Attorney, Agent, or Firm*—Oblon, Spivak, McClelland, Maier & Neustadt, L.L.P.

(57) ABSTRACT

A content acquisition method that ensures that the content acquisition device successfully receives attribute information of content data. By having an acquire/use information providing server, upon receiving a file request information sent from a client terminal send an acquire/use file, wherein the acquire/use file stores content data content identification information and attribute information in a portion where such information is not removed when passing through a proxy server which undertakes some of functions of the content receiving-side, to the client terminal via the proxy server, the present invention allows the acquire/use file to be sent via the proxy server without the attribute information contained in the file being removed, thereby allowing the client terminal to successfully receive attribute information.

20 Claims, 14 Drawing Sheets

1 DATA DISTRIBUTION SYSTEM

U.S. PATENT DOCUMENTS

| | | | |
|---|---|---|---|
| 7,299,271 B2* | 11/2007 | Sato | 709/219 |
| 7,308,487 B1* | 12/2007 | Dansie et al. | 709/219 |
| 7,339,104 B2* | 3/2008 | Oshiyama et al. | 84/602 |
| 2002/0012521 A1* | 1/2002 | Nagasaka et al. | 386/46 |
| 2002/0134224 A1* | 9/2002 | Umezawa et al. | 89/1.1 |
| 2002/0156917 A1* | 10/2002 | Nye | 709/238 |
| 2002/0178450 A1* | 11/2002 | Morita et al. | 725/61 |
| 2003/0028610 A1* | 2/2003 | Pearson | 709/213 |
| 2004/0015249 A1* | 1/2004 | Izumi et al. | 700/94 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 11-126171 | 5/1999 |
| JP | 2002-063298 | 2/2002 |
| JP | 2002-351498 | 12/2002 |
| WO | 2002/073424 | 9/2002 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005, Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, filed Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,689, filed Feb. 9, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.
R. Fielding et al., UC Irvine, Hypertext Transfer Protocol—HTTP/1.1, Network Working Group, RFC 2616, Standards Track, Jun. 1999.

* cited by examiner

36 DATA SIZE LIST

| CONTENT DATA | DATA SIZE |
|---|---|
| FILE A | 5000 KB |
| FILE B | 3000 KB |
| FILE C | 1500 KB |
| ⋮ | ⋮ |
| FILE N | 4500 KB |

| FIRST LOG | BILLING STATUS NOTIFICATION REQUEST INFORMATION | PURCHASE IDENTIFICATION INFORMATION RETRY ADDRESS POST DATA REQUEST CODE |
|---|---|---|
| SECOND LOG | TRACK FILE NAME ATTRIBUTE INFORMATION FILE NAME | |
| THIRD LOG | ALBUM IDENTIFICATION INFORMATION | |

CONTENT ACQUISITION METHOD

TECHNICAL FIELD

This invention relates to a content acquisition method suitable for acquiring for example content data of songs by a client terminal from a server via a network.

BACKGROUND ART

In a conventional download system, a WWW server couples download inspection data which stores various information such as file name, file size (i.e. the file size of the download target file), and file creation date and time, to the header portion of the download target file, to create a download file. The WWW server then sends the downloaded file to the client.

On the other hand, the client, upon receiving the download file, compares the file size contained in the download inspection data in the header portion with the actual file size of the download target file. If the two file sizes match, the client sends to the WWW server that the download was successful. If the two file sizes do not match, the client sends to the WWW server the discrepancy in the files sizes (for example, refer to patent literature 1).

Patent literature 1: Japanese Patent Laid-Open No. 2003-150480 (pages 5 and 6, FIGS. 2 and 4).

Now, the download system according to the above configuration may include a so-called proxy server which undertakes on behalf of the client certain functions and executes them, including protective functions protecting the client against external illegal access, and management functions regarding access to the client.

Also, with a download system thus configured, due to the recent increase in speed of data transmission and other factors, it has become common for communication between the client and a WWW server on the Internet to be carried out in compliance with a communication protocol called HTTP (Hyper Text Transfer Protocol).

HTTP is defined so that data to be provided, such as content data, can be stored in the main section of a transmitted file. HTTP is also defined to provide many items that allow storage of data, such as data stored in the main section, as well as the WWW server, various client and proxy server-related information. These include file size consisting of content data attribute information of the main section that is stored in an item called the Content-Length header field of the header portion of the transmitted file, and encoding specification information which specifies the encoding type applied by the sender to the main section that is stored in an item called the Transfer-Encoding header field.

When communicating with a client in compliance with HTTP, the WWW server determines that the main section is the download target file, and creates a download file which stores the file size of the download target file in its header portion. The WWW server then sends the downloaded file to the client via the proxy server.

However, for proxy servers, "If a Content-Length header field is present, its decimal value in octets represents both the entity-length and the transfer-length. The Content-Length header field must not be sent if these two lengths are different (i.e., if a Transfer-Encoding header field is present). If a message is received with both a Transfer-Encoding header field and a Content-Length header field, the latter must be ignored." (see http://www.studyinghttp.net/rfc_ja/2616/sec4.html#sec4.4). In other words, proxy servers are defined not to send a Content-Length header field if both a Transfer-Encoding header field and a Content-Length header field are stored in the header portion of the transmitted file.

Therefore, in the download system thus configured, according to the definition for proxy servers, such proxy servers may remove a file size from the header portion of the downloaded file sent from a WWW server. Thus, there existed a problem wherein a server was not assured that it will always receive file sizes as a part of the downloaded file from a WWW server.

DISCLOSURE OF THE INVENTION

In consideration of the above-mentioned problems, the present invention provides a content acquisition method that ensures reception of content data attribute information.

In order to overcome the above problems, the present invention provides a content acquisition method comprising: a file request information sending step of, in response to a request for content data, sending file request information that requests an acquire/use file storing acquire/use information including content data attribute information, to an acquire/use information providing device; an information receiving step of, in response to said sent content data request, receiving via a proxy device for undertaking some of functions of the content receiving-side, said acquire/use file that stores content identification information and said attribute information of said content sent by said acquire/use information providing device data in a portion where such information is not removed when the acquire/use file passes through said proxy device; a content request information sending step of sending content request information requesting said content data to a content providing device according to said acquire/use information contained in said acquire/use file; and a content receiving step of receiving said content data sent by said content providing device in response to the transmission of said content request information.

Therefore, in the content acquisition method according to the present invention, content data attribute information stored in the acquire/use file sent by the acquire/use information providing device via a proxy device is not removed when passing through the proxy device, thereby ensuring that content data attribute information is received.

The present invention also provides an acquire/use information providing method comprising: a request information receiving step of receiving file request information for requesting an acquire/use file that stores acquire/use information containing attribute information of content data, sent by a content acquisition device in response to a request for the content data by a content data acquisition device; and an information sending step of, in response to the received file request information, sending via a proxy device for undertaking some of the functions of the content receiving-side to said content acquisition device, said acquire/use file that stores content data content identification information and attribute information of the content data in a portion where such information is not removed when the acquire/use file passes through said proxy device.

Therefore, in the acquire/use information providing method according to the present invention, the acquire/use file can be sent to the content acquisition device via the proxy device without the content data attribute information stored in the acquire/use file being removed when passing through the proxy device.

The present invention also provides a content acquisition device comprising: a file request information sending means of, in response to a request for content data, sending file request information that requests an acquire/use file storing acquire/use information including content data attribute information, to an acquire/use information providing device; an information receiving means of, in response to said sent content data request, receiving via a proxy device for undertaking some of functions of the content receiving-side, said acquire/use file that stores content identification information and said attribute information of said content sent by said acquire/use information providing device data in a portion where such information is not removed when the acquire/use file passes through said proxy device; a content request information sending means of sending content request information requesting said content data to a content providing device according to said acquire/use information contained in said acquire/use file; and a content receiving means of receiving said content data sent by said content providing device in response to the transmission of said content request information.

Therefore, in the content acquisition method according to the present invention, content data attribute information stored in the acquire/use file sent by the acquire/use information providing device via a proxy device is not removed when passing through the proxy device, thereby ensuring that content data attribute information is received.

The present invention also provides an acquire/use information providing device characterized by comprising: a request information receiving means of receiving file request information for requesting an acquire/use file that stores acquire/use information containing attribute information of content data, sent by a content acquisition device in response to a request for the content data by a content data acquisition device; and an information sending means of, in response to the received file request information, sending via a proxy device for undertaking some of the functions of the content receiving-side to said content acquisition device, said acquire/use file that stores content data content identification information and attribute information of the content data in a portion where such information is not removed when the acquire/use file passes through said proxy device.

Therefore, in the acquire/use information providing method according to the present invention, the acquire/use file can be sent to the content acquisition device via a proxy device without the content data attribute information stored in the acquire/use file being removed when passing through the proxy device.

The present invention also provides a content acquisition program for performing: a file request information sending step of, in response to a request for content data, sending file request information that requests an acquire/use file storing acquire/use information including content data attribute information, to an acquire/use information providing device; an information receiving step of, in response to said sent content data request, receiving via a proxy device for undertaking some of functions of the content receiving-side, said acquire/use file that stores content identification information and said attribute information of said content sent by said acquire/use information providing device data in a portion where such information is not removed when the acquire/use file passes through said proxy device; a content request information sending step of sending content request information requesting said content data to a content providing device according to said acquire/use information contained in said acquire/use file; and a content receiving step of receiving said content data sent by said content providing device in response to the transmission of said content request information.

Therefore, in the content acquisition program according to the present invention, content data attribute information, stored in the acquire/use file sent by the acquire/use information providing device via a proxy device to the information processing device, is not removed when the acquire/use information passé through the proxy device, thereby ensuring that content data attribute information is received.

The present invention also provides an acquire/use information providing program for performing: a request information receiving step of receiving file request information for requesting an acquire/use file that stores acquire/use information containing attribute information of content data, sent by a content acquisition device in response to a request for the content data by a content data acquisition device; and an information sending step of, in response to the received file request information, sending via a proxy device for undertaking some of the functions of the content receiving-side to said content acquisition device, said acquire/use file that stores content data content identification information and attribute information of the content data in a portion where such information is not removed when the acquire/use file passes through said proxy device.

Therefore, in the acquire/use information providing program according to the present invention, the acquire/use file can be sent from the content acquisition device to the information processing device via a proxy device without the content data attribute information stored in the acquire/use file being removed when passing through the proxy device.

In the acquire/use information providing device according to the present invention, when file request information requesting an acquire/use file storing acquire/use information containing the content data attribute information that is sent by a content acquisition device in response to a request by a content data is received, an acquire/use file storing content data content identification information and attribute information in a portion where such information is not removed when the acquire/use file passes through a proxy device which undertakes some of functions of the content receiving-side, is sent in response to the content acquisition device via the proxy device, allowing the acquire/use file to be sent to the content acquisition device via the proxy without the content data attribute information stored in the acquire/use file being removed, and thereby achieving a content acquisition method, an acquire/use information providing method, a content acquisition device, an acquire/use information providing device, a content acquisition program, and an acquire/use information providing program which ensures the proper receiving of content data attribute information by the content acquisition device.

BEST MODE FOR CARRYING OUT THE INVENTION

One embodiment of the present invention will now be described in detail with reference to the accompanying drawings.

(1) General Configuration of the Data Distribution System

Figure 1:
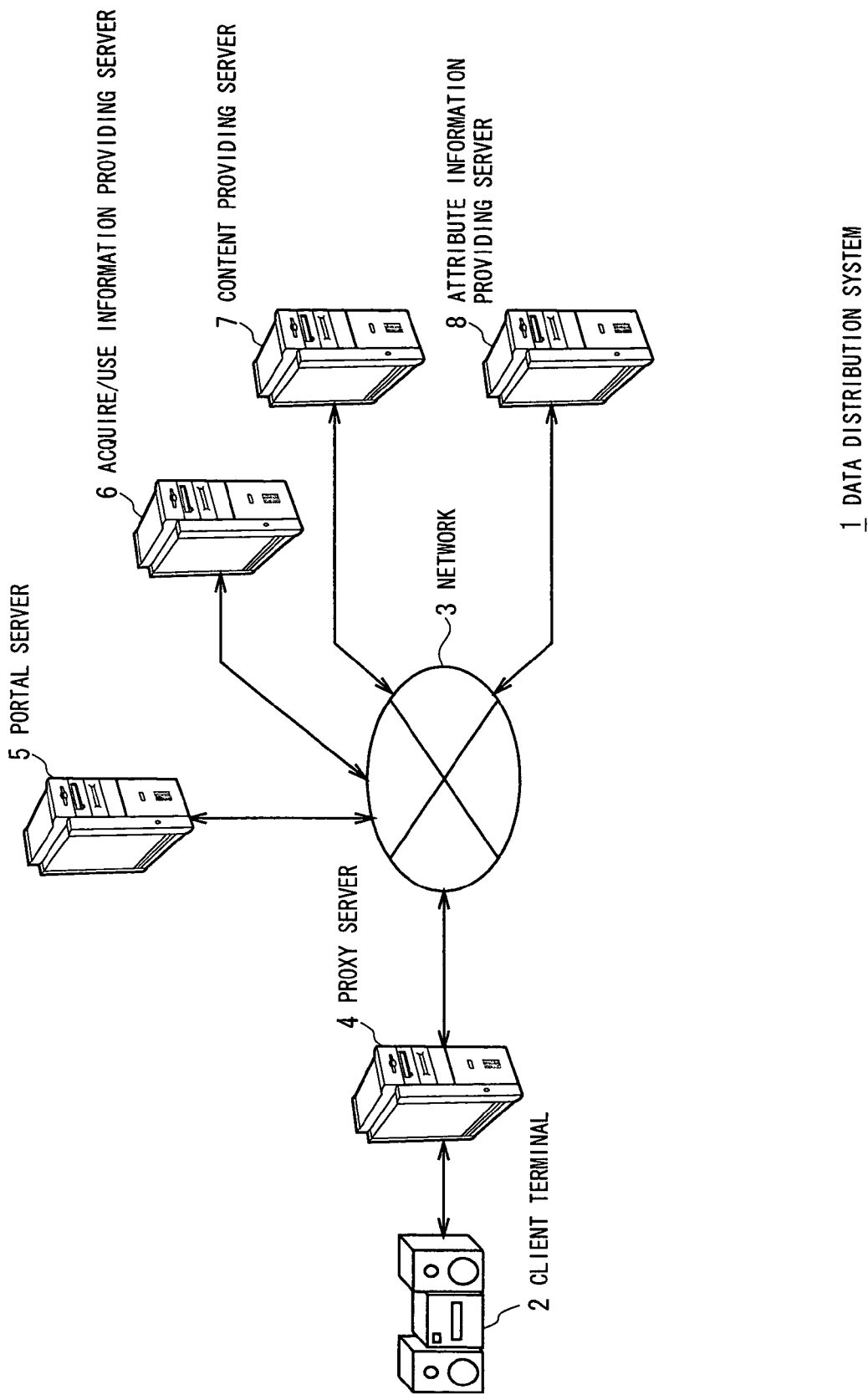
FIG. 1 is a schematic perspective view of one embodiment of the general configuration of the data distribution system according to the present invention.

In FIG. 1, the reference numeral 1 is a general depiction of the data distribution system according to the present invention. A client terminal 2 communicates with various servers on a network 3 such as the Internet, via a computer-configured proxy server 4. Furthermore, the client terminal 2 communicates with the various servers in compliance with a communication protocol called HTTP (Hyper Text Transfer Protocol).

When the client terminal 2 is requested by the user through use of a music delivery system provided on the network 3 to purchase one or more songs, it accesses a computer-configured acquire/use information providing server 6 via computer-configured servers 5 (hereinafter referred to as "portal servers"). The client terminal 2 then acquires from the acquire/use information providing server 6 an acquire/use file to be used for acquiring content attribute information for changing the attributes of the content data corresponding to the songs requested by the user for purchase, and the playing of such content data, etc.

Thus, the client terminal 2 acquires content data for each purchase-requested song from a computer-configured contents providing server 7, according to the description on the acquire/use file. The client terminal 2 then acquires for each song content attribute files storing content attribute information corresponding to content data from a computer-configured attribute providing server 8, also according to the description on the acquire/use file.

In this fashion, the client terminal 2 acquires both content data and content attribute files according to song purchase requests. The client terminal 2 is now ready to playback songs, as requested by the user, by replaying corresponding content data in accordance with content attribute information contained in the content attribute file.

(1-1) Configuration of Proxy Server 4

Figure 2:
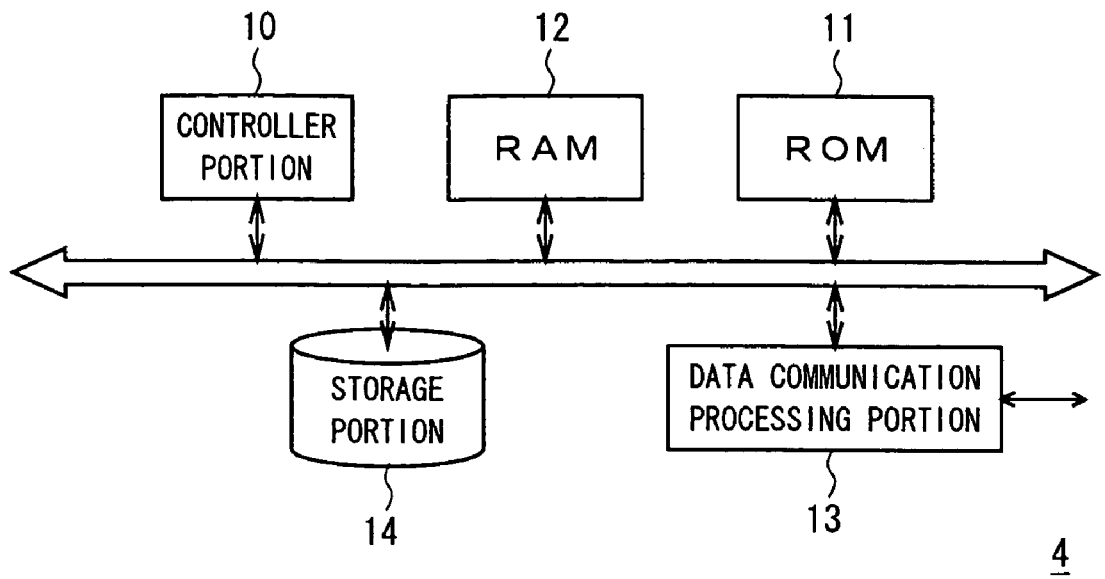
FIG. 2 is a block diagram showing the circuitry of a proxy server.

As shown in FIG. 2, the proxy server 4 has a controlling portion 10, composed of a CPU (central processing unit), which is responsible for overall control and various processing via ROM (read only memory) 11 and RAM (random access memory) 12, in accordance with the activated OS (operating system) and other base programs, and with various applications.

By temporarily retrieving, for example, the information to be sent by the client terminal 2 to the various servers on network 3, or the information sent by the various servers to the client terminal 2, via a data communication processing portion 13, the controller portion 10 protects the client terminal 2 from illegal external access. The controller portion 10 also manages access to the client terminal 2 by temporarily retrieving various information that is sent and received by client terminal 2. Thus, controller portion 10 undertakes certain functions of client terminal 2.

In addition, the controller portion 10 has a so-called cache function, wherein contents, as they are being acquired by the client terminal 2 from a desired point of access on network 3, is temporarily retrieved via the data communication processing portion 13 and duplicated to be stored in a storage portion 14. Therefore, whenever a request is made by the client terminal 2 or other terminals for the same content on the same point of access, the controller portion 10 retrieves the corresponding content from the storage portion 14 without re-accessing the original access point, and sends it to the client terminal 2 or other terminals.

(1-2) Configuration of Portal Server 5

Figure 3:
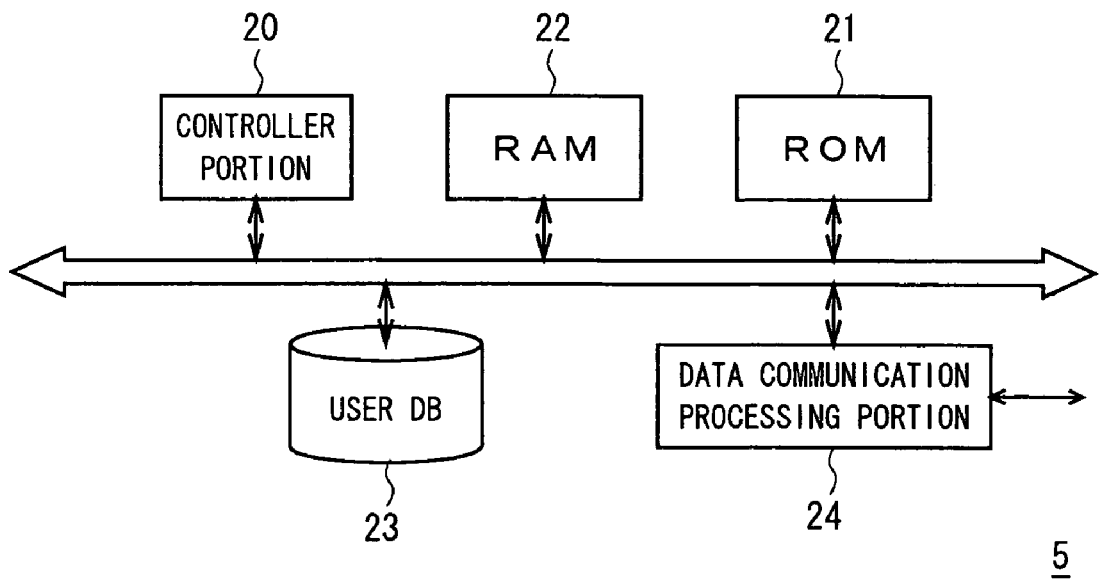
FIG. 3 is a block diagram showing the circuitry of a portal server.

Referring to FIG. 3, the portal server 5 has a controlling portion 20, composed of a CPU, which is responsible for overall control and various processing via ROM 21 and RAM 22, in accordance with the activated OS (operating system) and other base programs, and with various applications such as a content distribution service program.

The controlling portion 20 records identification information for each user having permission to use the data distribution system 1 (hereinafter referred to as "user IDs"), and password and other personal information, on a user database 23. When song purchase request data is sent from client terminal 2 in response to a purchase request for one or more songs from the user, the controlling portion 20 receives this song purchase request data via a data communication processing portion 24, and processes authentication against the user based on the user ID and password stored in the song purchase request data, and personal information contained in the user database 23.

When personal authentication of the user requesting the song purchase is completed, the controlling portion 20 creates purchase confirmation data to confirm song purchase by the user. The controlling portion 20 then sends this purchase confirmation data to the client terminal 2 via the data communication processing portion 24 to have the user confirm whether the song purchase will proceed or not.

After confirmation by the user of the client terminal 2 of the song purchase, the controlling portion 20 receives the song purchase confirmation data sent from the client terminal 2 via the data communication processing portion 24. The controlling portion 20 then retrieves identification information allowing content data of purchase-requested song that has been stored in the song purchase request data (hereinafter referred to as "content ID"), in response to receiving the song purchase confirmation data, and creates file request data storing the retrieved content ID. The controlling portion 20 then sends this file request data to the acquire/use information providing server 6 via the data communication processing portion 24. When receiving the acquire/use file sent by the acquire/use information providing server 6, the controlling portion 20 sends the received acquire/use file to the client terminal 2 via the data communication processing portion 24 through the proxy server 4.

(1-3) Configuration of Acquire/Use Information Providing Server 6

Figure 4:
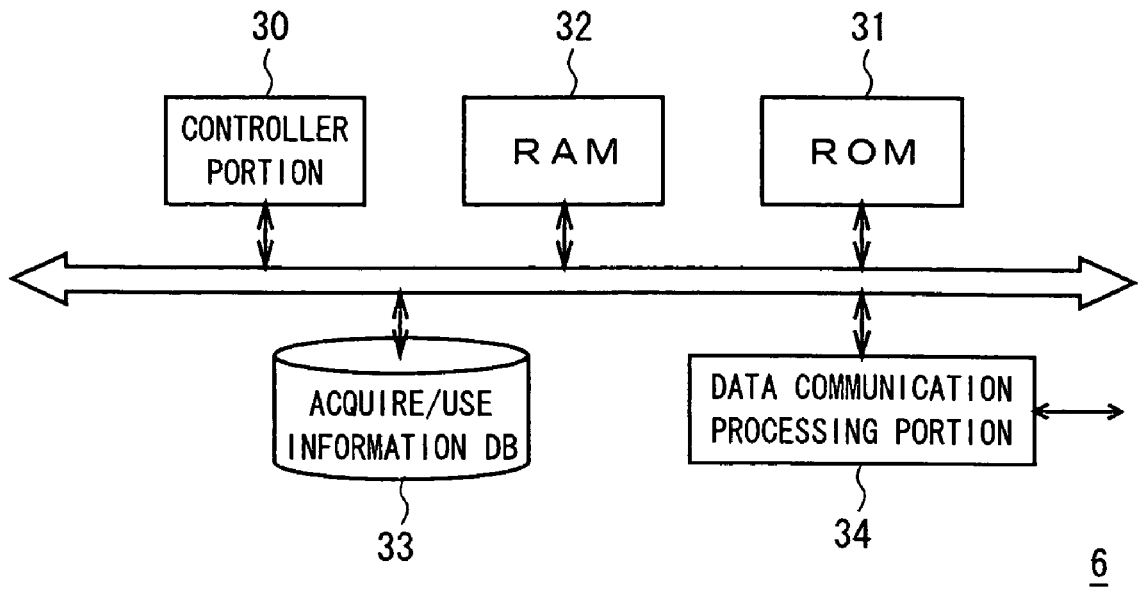
FIG. 4 is a block diagram showing the circuitry of an acquire/use information providing server.

Referring now to FIG. 4, the acquire/use information providing server 6 has a controlling portion 30, composed of a CPU, which is responsible for overall control and various processing via ROM 31 and RAM 32, in accordance with the activated OS (operating system) and other base programs, and with various applications program such as an acquire/use providing program.

The controlling portion 30 associates the content ID of content data, the homepage address (URL: uniform resource locator) of the homepage set up by the content providing server 7 to provide content data (hereinafter referred to as "content providing homepage"), the homepage address (URL) of the homepage set up by the attribute information providing server 8 to provide content attribute files (hereinafter referred to as "attribute file providing homepage"), and data size information comprised of content data attribute information, to each song, and records them as acquire/use information on the acquire/use information database 33.

When receiving the file request data sent by the portal server 5 via a data communication processing portion 34, the controlling portion 30 respectively searches an acquire/use information database 33, based on the content ID stored in the file request data, for the content providing homepage address corresponding to each content ID of one or more purchase-requested songs (hereinafter referred to as "content providing address"), the attribute file providing homepage address (hereinafter referred to as "attribute file providing address"), and data size information of content data.

Figure 5:
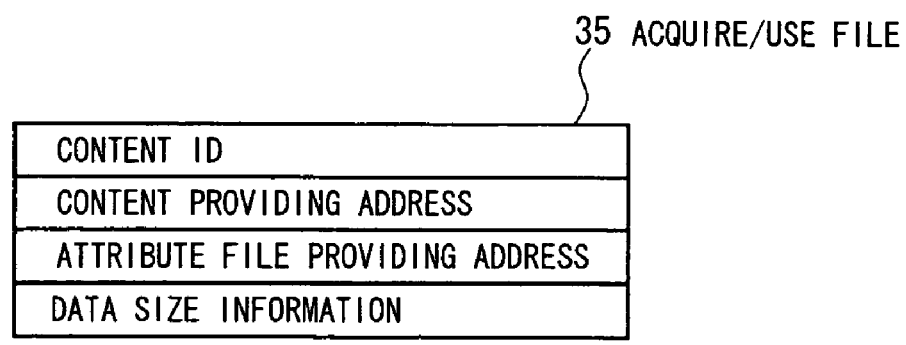
FIG. 5 is a schematic view showing the configuration of an acquire/use file.

Referring now to FIG. 5, the controlling portion 30 then creates an acquire/use file 35 storing acquire/use information composed of the content ID corresponding to the purchase-requested song, as well as the content providing address, the attribute file providing address, and the data size information found on the acquire/use information database 33. However, the controlling portion 30 stores the acquire/use information in a main section of the acquire/use file 35 wherein such information is not removed when passing through the proxy server 4. Thus, the controlling portion 30 sends the acquire/use file 35 from the data communication processing portion 34 to the client terminal 2 via he portal server 5 and the proxy server 4.

Figures 6, 7:
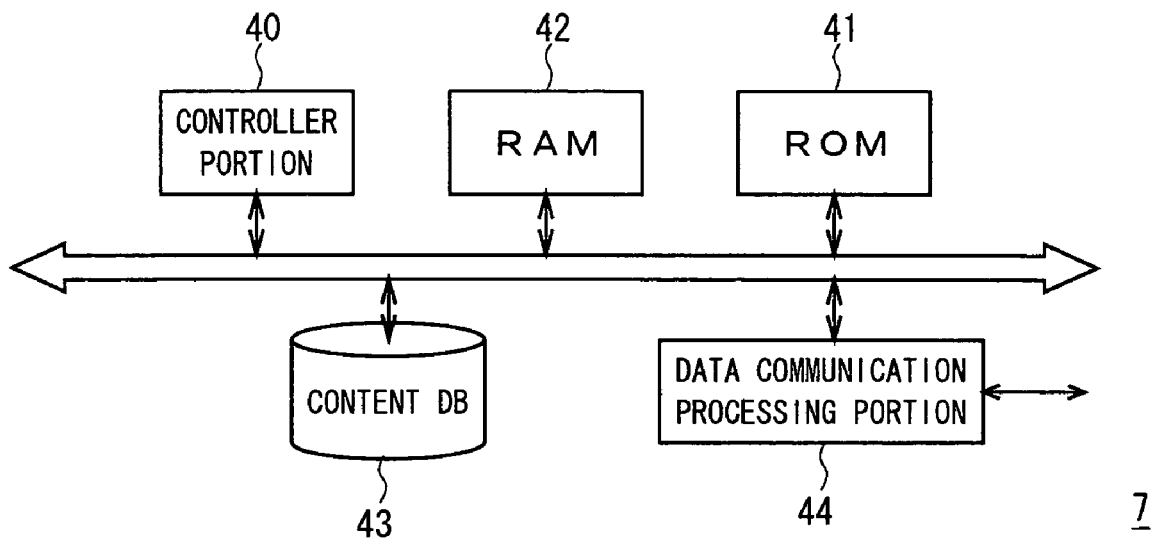
FIG. 6 is a schematic view showing the configuration of a data size list.
FIG. 7 is a block diagram showing the circuitry of a content providing server.

Incidentally, as shown in FIG. 6, when a plurality of content IDs are sent from the client terminal 2 in response to song purchase requests for a plurality of songs, the controlling portion 30 creates a data size list 36 listing data size information of the plurality of content data. The controlling portion 30 stores this data size list 36 in the main section of the acquire/use file 35.

Therefore, regardless of whether the user purchase requests one song or a plurality of songs such as albums, the controller portion 30 stores all data size information of content data corresponding to the purchase-requested songs in the main section of the acquire/use file 35 and provides it to the client terminal 2.

(1-4) Configuration of Content Providing Server 7

Referring to FIG. 7, the content providing server 7 has a controlling portion 40, composed of a CPU, which is responsible for overall control and various processing via ROM 41 and RAM 42, in accordance with the activated OS (operating system) and other base programs, and with various applications program such as a content providing program.

Thus, the controlling portion 40 mutually associates and records numerous content data and content IDs on the content data base 43. When a content request data storing a content ID contained in the acquire/use file 35 is sent while the client terminal 2 accesses the content providing homepage according to the content providing address contained in the acquire/use file 35, the controller portion 40 receives the content request data via a data communication processing portion 44.

The controller portion 40 then searches a content database 43, based on the content ID stored in the file request data, for the corresponding content data. The controller portion 40 then sends the located content data to the client terminal 2 via the data communication processing portion 44.

(1-5) Configuration of Attribute Information Providing Server 8

Figure 8:
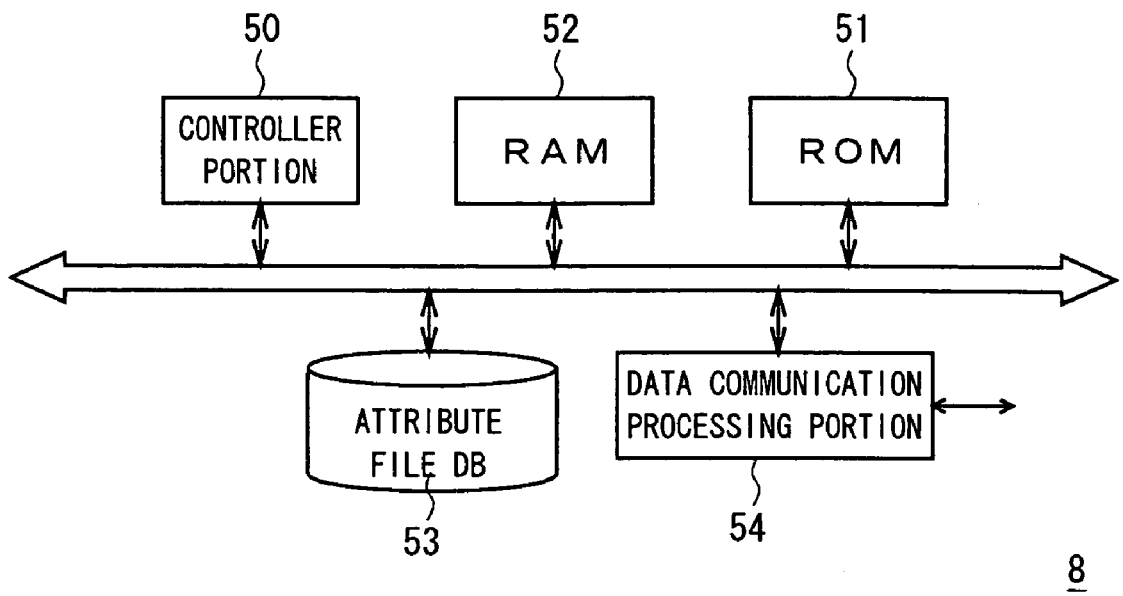
FIG. 8 is a block diagram showing the circuitry of an attribute information providing server.

Referring to FIG. 8, the attribute information providing server 8 has a controlling portion 50, composed of a CPU, which is responsible for overall control and various processing via ROM 51 and RAM 52, in accordance with the activated OS (operating system) and other base programs, and with various application program such as an attribute information providing program.

Thus, for each content attribute file, the controlling portion 50 mutually associates and records the content attribute file and the attribute file providing address of the attribute file providing homepage that provides the content attribute file in an attribute file data base 53. When the client terminal 2 accesses the attribute file providing homepage according to the attribute file providing address contained in the acquire/use file 35, the controller portion 50, in response, searches for the content attribute file provided on the accessed attribute file providing homepage in among the attribute file data base 53. The controller portion 50 sends the located content attribute file to the client terminal 2 via a data communication processing portion 54.

Figure 9:
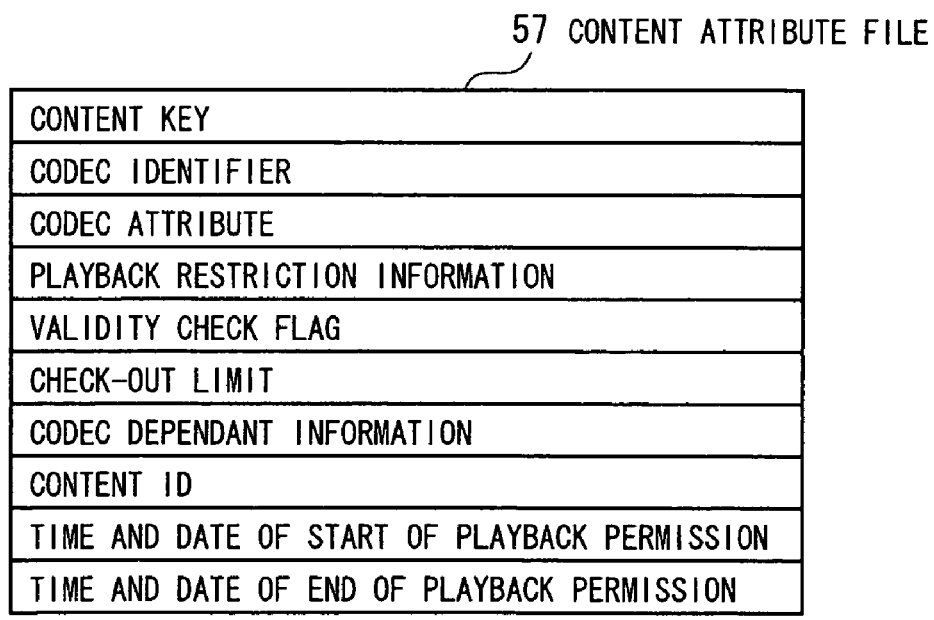
FIG. 9 is a schematic view showing the configuration of a content attribute file.

Referring now to FIG. 9, a content attribute file 57 stores content attribute information for changing the attribute of the corresponding content data. The content attribute information comprises: a content key used when decoding content data at the client terminal 2, a codec identifier and codec attribute referred to when decrypting compression performed by the sender on the decoded content data, playback restriction information indicating the number of times playback is allowed, regulated as usage rights of the content data, a validity check flag for checking the validity of the content data, a so-called check-out limit regulating the number of times the client terminal 2 is allowed to copy and record the content data on an external recording medium, codec dependant information, the content ID of the corresponding content data, and time and date of start and end of playback permission indicating the time period for which playback is allowed, regulated as usage rights of the content data.

Therefore, as apparent from FIG. 9, the client terminal 2 receiving only the content data is prevented from decrypting the encryption performed on the content data or from decoding and replaying the content data, unless both the content data and the corresponding content attribute file 57 are available. Thus, by preparing the content attribute file 57 corresponding to the content data, the controlling portion 50 prevents illegal use by a third party who obtains only the content data.

(1-6) Configuration of Client Terminal 2

Figure 10:
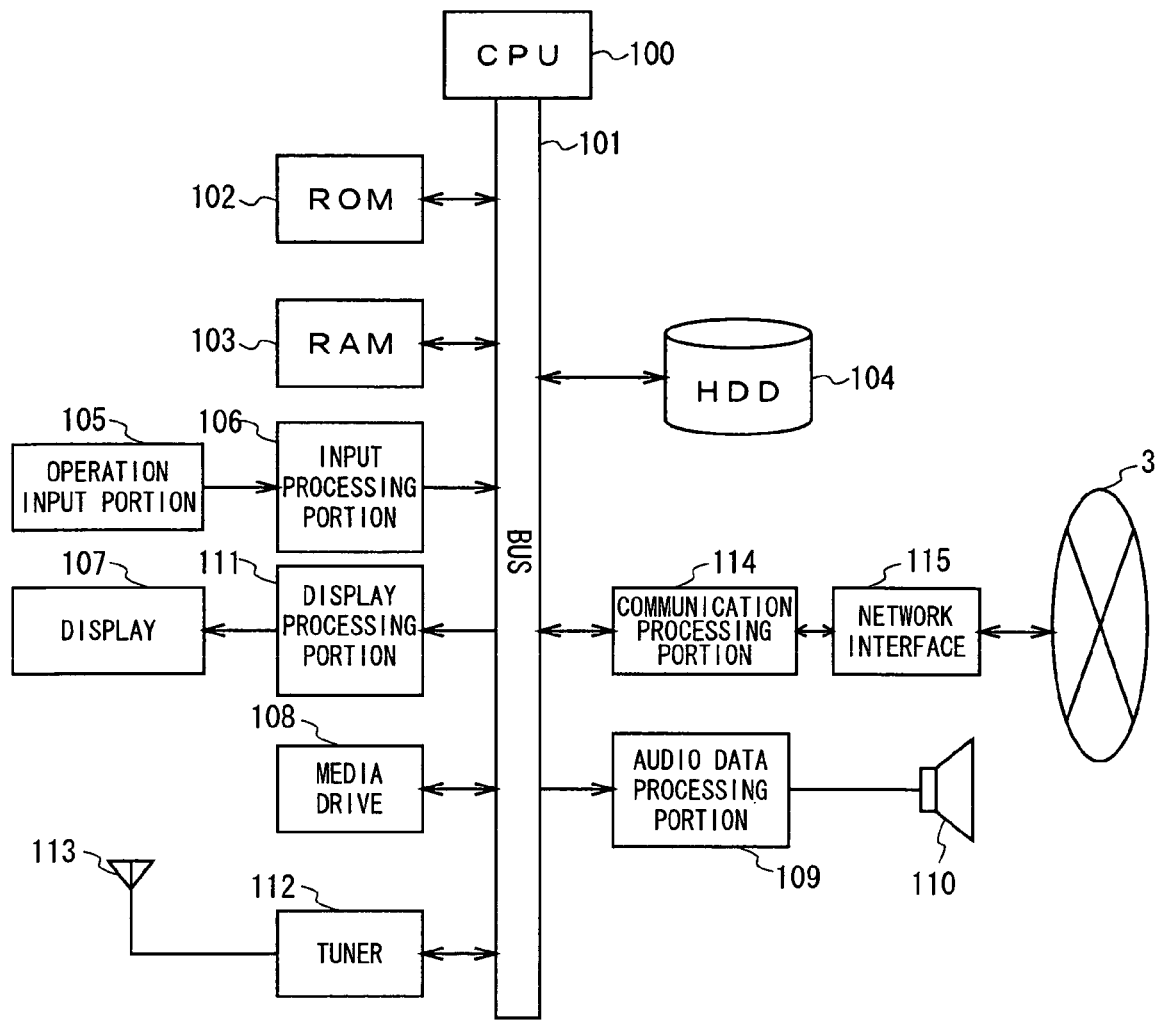
FIG. 10 is a block diagram showing the circuitry of a client terminal.

Referring to FIG. 10, a CPU 100 of a client terminal 2 performs overall control and predetermined processing based on base programs and various applications retrieved from the ROM 102 connected via bus 101 and expanded on RAM 103.

The CPU 100 performs communication operations for purchasing songs via a network 3, user's input and output operations, playback of content data from media, and writing of content data downloaded from radio stations as well as content data and content attribute files 57 acquired by purchasing songs, to a hard disk drive (HDD) 104, and management thereof.

An operation input portion 105 sends input information according to the user's operation with various operators of the chassis surface of the main body or a remote controller (not shown) to an input processing portion 106. The input processing portion 106 in turn sends the input information to the CPU 100 after performing predetermined processing. The CPU 100 then executes processing in accordance with the operation command.

A display 107 displays processing results of CPU 100 and various information. The display 107 may be a display device such as a liquid crystal display mounted directly on to the chassis surface of the main body, or an external display device.

A media drive 108 may be a CD (compact disc) player or a drive for replaying Memory Sticks™ consisting of flash memories. The media drive 108 outputs the playback results of CDs or Memory Sticks through a 2-channel speaker 110 after performing digital-analog conversion via an audio data processing portion 109.

When the data replayed via the media drive 108 is a song content data, the CPU 100 may record it as an audio data file on to the hard disk drive 104.

The CPU 100 may also retrieve a plurality of still images stored in a Memory Stick by the media drive 108, and display them as a slide show on display 107 via a display processing portion 111.

The CPU may also retrieve a plurality of songs stored in the hard disk drive 104 by random access, and output the songs by replaying them in any order desired by the user just like a jukebox.

A tuner portion 112 may be an AM or FM radio tuner. The tuner portion 112, under the control of the CPU 100, demodulates the broadcast signal received by an antenna 113 and outputs the result as a broadcast audio signal from the speaker 110 via the audio data processing unit 109.

A communications processing portion 114, under the control of the CPU 100, performs encoding of the sent data, and sends it to the external network devices (i.e. various servers) via network 3 and through a network interface 115. The communications processing portion 114 also decodes received data such as content data received from the external network devices (i.e. various servers) via the network interface 115, and relays it to the CPU 100.

(1-7) Directory Management of Content Data

Figure 11:
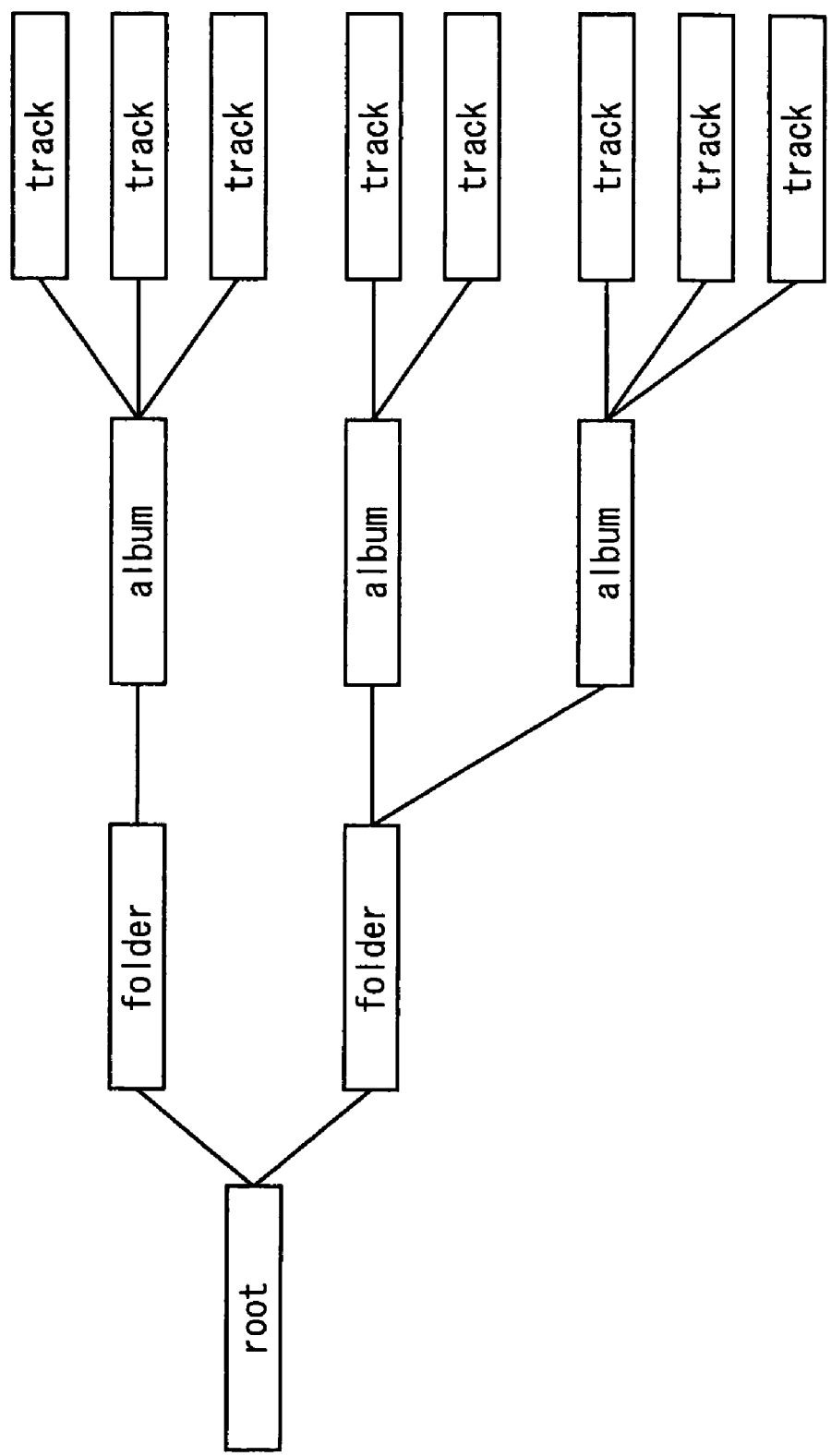
FIG. 11 is a schematic view explaining directory management of content data.

The CPU 100 of the client terminal 2 manages content data recorded on the hard disk drive 104 according to the directory configuration shown on FIG. 11. First, any given number of "folder" directories within a defined limit is created under a "root" directory. The "folder" directory is created to correspond to the genre of the content data', or owner/users, etc.

Next, any given number of "album" directories within a defined limit is created under this "folder" directory to correspond to album titles, for example. Under this "album" directory is stored one or more "track" file deemed to belong to the "album" directory. Each "track" file is a song, or in other words, its content data.

Directory management of such content data is designed to be performed by the data base file recorded on the hard disk drive 104.

(1-8) Program Module Configuration of Client Terminal 2

Figure 12:
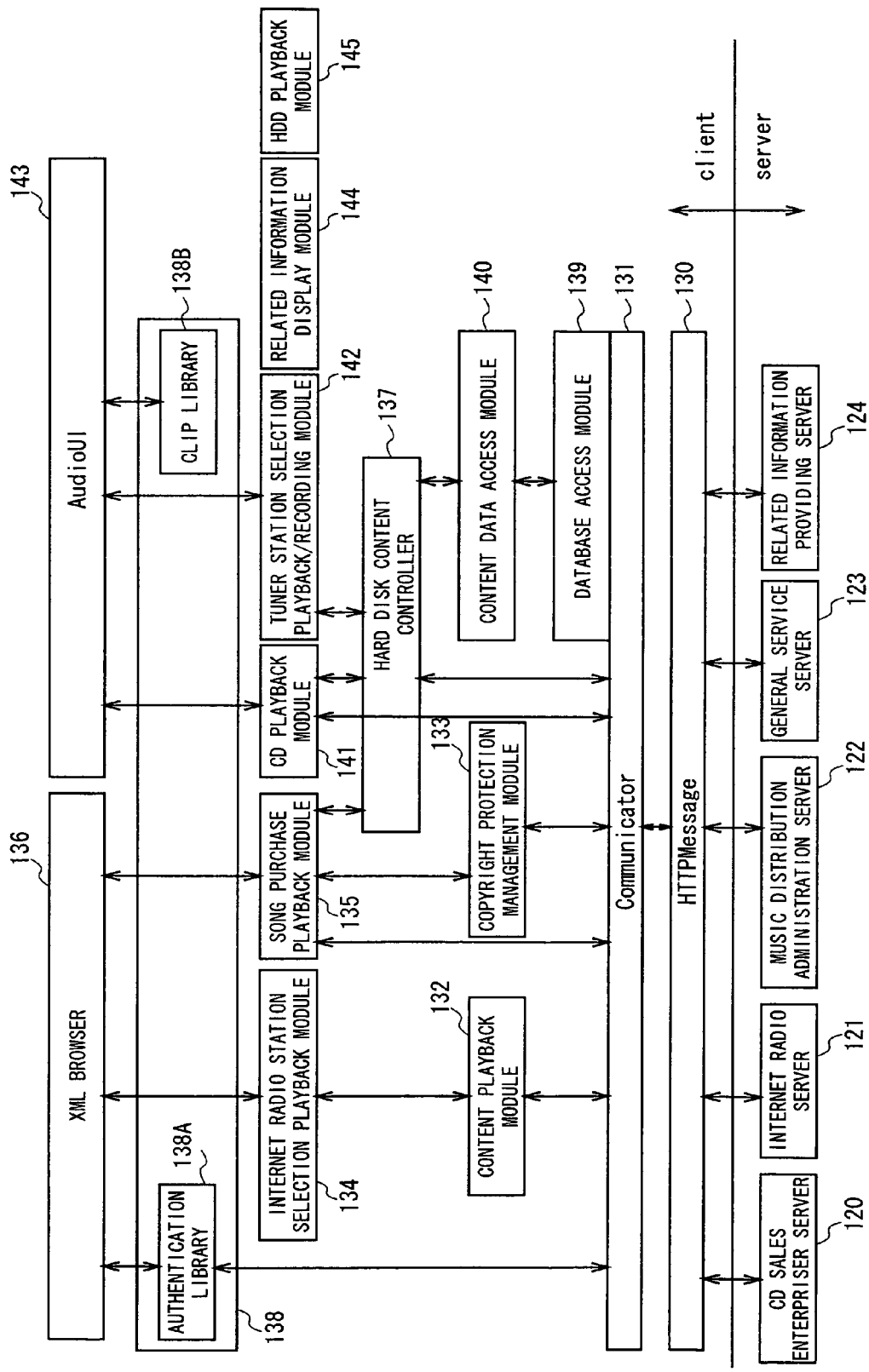
FIG. 12 is a schematic view showing the program module of a client terminal.

The program module of the client terminal 2 operates on an OS, as shown in FIG. 12. Specifically, exchange is performed between a CD sales enterpriser server 120 which sells CDs, an Internet radio server 121, the aforementioned acquire/use information providing server 6, a music distribution administration server 122 comprising the content providing server 7 and the attribute information providing server 8, a general service server 123 comprising the aforementioned portal server 5, a related information providing server 124 which provides song information pertaining to songs broadcasted by a radio station, as related information to the client terminal 2 via the network 3, and other various servers.

An HTTP message program 130 is a program module that handles exchange by HTTP communication between the CD sales enterpriser server 120, the Internet radio server 121, the music distribution administration server 122, the general service server 123 which provides various general services, the related information providing server 124, and other various servers. A communicator program 131 is a program module that handles exchange with the HTTP message program 130.

Above the communicator program 131 are a content playback module 132 which interprets the codec of the content data and replays it, and a copyright protection information management module 133 which handles information regarding usage rights and other copyright protection-related information. Above the content playback module 132 and the copyright protection information management module 133 are an Internet radio station selection playback module 134 which selects an internet radio station and performs playback, and a song purchase playback module 135 responsible for purchasing songs and replaying sample songs in accordance with the contents of the contents attribute file 17.

An XML (eXtensible Markup Language) browser 136 is positioned above the Internet radio station selection playback module 134 and the song purchase playback module 135. The XML browser 136 interprets the XML files from the various servers, and displays them on the display 107.

For instance, for a song selected for purchase by the user via the XML browser 136, an acquire/use file 35 is acquired by the song purchase module 135, while content data and a content attribute file 57 are acquired by the song purchase playback module 135 and the copyright protection information management module 133, and the files are written onto the hard disk drive 104 via a hard disk content controller 137.

An authentication library 138A of a library 138 is connected to the communicator program 131. The library 138 performs authentication processing of the general service server 123 or other various servers through the authentication library 138A.

Furthermore, a database access module 139, a content data access module 140, and the hard disk content controller 137 are positioned above the communicator program 131.

The database access module 139 accesses the various databases constructed in the hard disk drive 104. The content data access module 140 accesses the content data and content attribute file 57 stored on the hard disk drive 104. The hard disk content controller 137 manages the content data and content attribute file 57 stored on the hard disk drive 104.

Above the hard disk content controller 137 is a related information display module 141 which displays the title and name of artist of the song broadcasted by the radio station, and a tuner station selection playback/recording module 142 which selects radio stations and records song content data received from that radio station onto the hard disk drive 104.

For instance, a song received from the selected radio station via an audio user interface 143 is written onto the hard disk drive 104 via the content data access module 140.

The related information display module 141 receives as related information title and artist name of the song currently playing on the radio station selected by the tuner station selection playback/recording module 142 from the related information providing server 124 via HTTP message 130, and displays it on the display 107 via the audio user interface (UI) 143.

The related information displayed on the displayed 107 via the audio user interface 143 may be temporarily stored in a clip library 138B of library 138, to be eventually recorded on the hard disk drive 104 via the database access module 139 according to the instructions by the user Additionally, the program module of the client terminal 2 includes a CD playback module 144 to replay CDs, and a HDD playback module 145 to replay the hard disk drive 104. The CD playback module 144 and the HDD playback module 145 outputs playback results from the CD and the hard disk drive 104 through the speaker 110 via the audio data procession portion 109.

(2) Song Purchase Process (2-1) Procedure of Song Purchase Process

Next, with reference to the sequential charts shown on FIGS. 13 and 14, the procedures of song purchase process executed by the client terminal 2 and the various servers in response to the song purchase request made by the user will be described.

Figure 13:
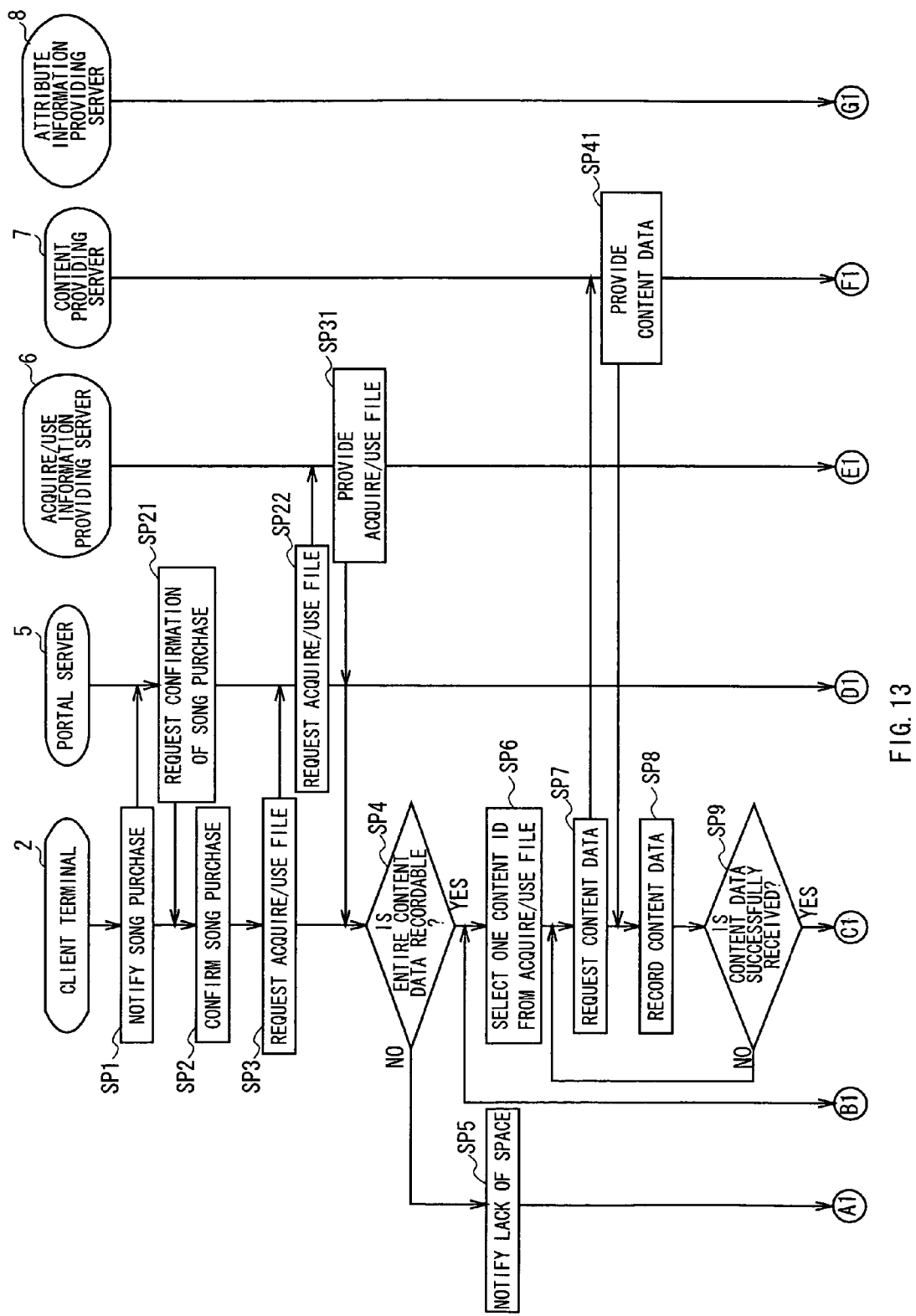
FIG. 13 is a sequential chart showing Song Purchasing Process Procedure (1)
Figure 14:
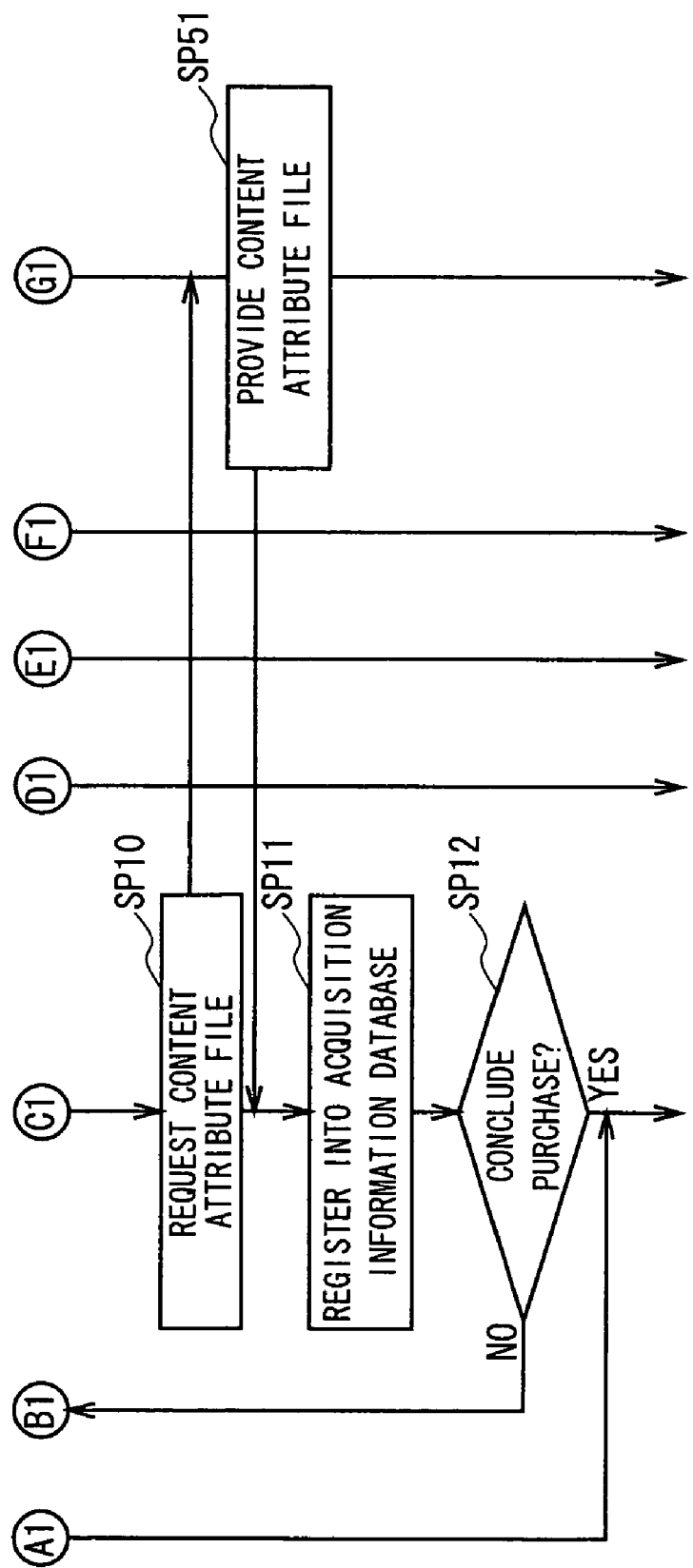
FIG. 14 is a sequential chart showing Song Purchasing Process Procedure (2)

As shown on FIGS. 13 and 14, the client terminal 2 starts the acquisition process to acquire the acquisition target content data and the content attribute file 57, in response to the user's purchase request of one or more songs. The acquisition process starts at step SP1 wherein the client terminal 2 creates a song purchase request data that stores the user's user ID and password, and a content ID corresponding to the purchase-requested song. The client terminal 2 sends the song purchase request data to the portal server 5, and proceeds to step SP2.

In step SP21, the portal server 5 performs a personal authentication on the user based on the song purchase request data sent by the client terminal 2, and then creates a purchase confirmation data and sends it to the client terminal 2, and proceeds to step SP22.

In step SP2, the client terminal 2 asks the user to confirm the purchase-requested song on a predetermined screen, in response to the purchase confirmation information sent by the portal server 5. Once the user confirms the purchase-requested song, the client terminal 2 proceeds to step SP3.

In step SP3, the client terminal 2 creates an acquire/use information request data storing the user ID, and sends it to the portal server 5 before proceeding to step SP4.

In step SP22, the portal server 5 creates a file request data storing the content ID corresponding to the purchase target song, in response to the acquire/use information request data sent by the client terminal 2. The portal server 5 then sends the file request data to the acquire/use information providing server 6.

In response, in step SP31, the acquire/use information providing server 6 creates an acquire/use file 35 which stores the acquire/use information in its main section, based on the file request data sent by the portal server 5. The acquire/use information providing server 6 then sends the acquire/use file 35 to the client terminal 2 via the portal server 5 and a proxy server 4.

Thus, in step SP4, the client terminal 2 receives the acquire/use file 35 sent by the acquire/use information providing server 6 via the portal server 5 and the proxy server 4. When the purchase request is for one song, data size information of the content data is retrieved as is from the acquire/use file 35 by the client terminal 2. When the purchase request is for a plurality of songs, data size information of the content data is retrieved as a data size list from the acquire/use file 35 by the client terminal 2.

The client terminal 2 then compares the total value of all data size information corresponding to the purchase target content data, against the free space of the hard disk. Based on the result of this comparison, the client terminal 2 determines whether or not the hard disk can record all purchase target content data.

A negative comparison result in step SP4 means that the hard disk does not have enough free space to record all purchase target content data, thus a part or the whole of the purchase target content data will not be recorded on the hard disk by continuing with the acquisition process. The client terminal 2 then proceeds to step SP5.

In step SP5, the client terminal 2 notifies the user, through a predetermined notification screen displayed on for example display 107, that the hard disk does not have enough free space to record all purchase target content data. The client terminal 2 also notifies the user, through the predetermined notification screen that the purchase target content data will not be recorded on the hard disk by continuing with the acquisition process. Upon notification of the user, the client terminal 2 temporarily concludes the acquisition process.

Conversely, a positive comparison result in step SP5 means that the hard disk has enough free space to record all purchase target content data, thus the purchase target content data in its entirety will be recorded on the hard disk by continuing with the acquisition process. The client terminal 2 then proceeds to step SP6.

In step SP6, the client terminal 2 selects from the acquire/use file 35 one content ID of content data to request to the content providing server 7, and proceeds to step SP7.

In step SP7, the client terminal 2 selects from the acquire/use file 35 the content providing address corresponding to the content ID selected in step SP6. The client terminal 2 then accesses the content providing homepage according to the content providing address, while sending a content request data storing the content ID to the content providing server 7, and proceeds to step SP8.

In step SP41, the content providing server 7 sends the content data designated by the content ID to the client terminal 2, in response to the request from the client terminal 2.

Therefore, in step SP8, the client terminal 2 receives the content data sent by content providing server 7 and records it on the hard disk. Once the content data is received, the client terminal 2 proceeds to step SP9.

In step SP9, the client terminal 2 compares the data size of the content data actually received in response to the acquisition request (i.e. the data size of the content data actually recorded on the hard disk), with the data size information corresponding to the content data previously notified by the acquire/use file 35. Based on the result of this comparison, the client terminal 2 determines whether or not the content data was properly received and the acquisition successful.

A negative comparison result in step SP9 means that the content data was damaged during transmission from the content providing server 7, and only a portion of the data size of the content data notified by the acquire/use file 35 was actually received. The client terminal 2 then returns to step SP7, and requests the content providing server 7 to re-send the content data.

Meanwhile, a positive comparison result in step SP9 means that the content data was not damaged during transmission from the content providing server 7, and the full data size of the content data notified by the acquire/use file 35 was properly received. The client terminal 2 then proceeds to step SP10.

In step SP10, the client terminal 2 selects from the acquire/use file 35 the attribute file providing address corresponding to the content ID selected in step SP6. The client terminal 2 then accesses the attribute file providing homepage according to the attribute file providing address, and proceeds to step SP11.

In step SP51, the attribute information providing server 8 sends a content attribute file 57 corresponding to the attribute file providing homepage accessed by the client terminal 2 to client terminal 2.

Therefore, in step SP11, the client terminal 2 receives the content attribute file 57 sent by the attribute information providing server 8 and records it on the hard disk. Once the content attribute file 57 is received, the client terminal 2 proceeds to step SP12.

In step SP12, the client terminal 2 determines whether or not the content data and the content attribute file 57 corresponding to the purchase-requested songs were received in their entirety (i.e. whether all purchase-requested songs were purchased or not).

A negative result in step SP12 means that, while the user's purchase request was for a plurality of songs contained in an album, not all of the content data and content attribute files 57 corresponding to the plurality of songs have been acquired yet. The client terminal 2 then returns to step SP6 and hereafter will cyclically repeat the processes in steps SP6 through SP12 until a positive result in step SP12 is obtained. Thus, the client terminal 2 sequentially and alternately acquires content data and content attribute files 57 corresponding to the purchase-requested songs by the user from the content providing server 7 and the attribute information providing server 8.

Conversely, a positive result in step SP12 means that all of the content data and content attribute files 57 corresponding to either one song or all of the songs in an album purchase-requested by the user have been acquired. The client terminal 2 then completes the acquisition process.

(2-2) Alternative Procedure of the Song Purchase Process

Figure 15:
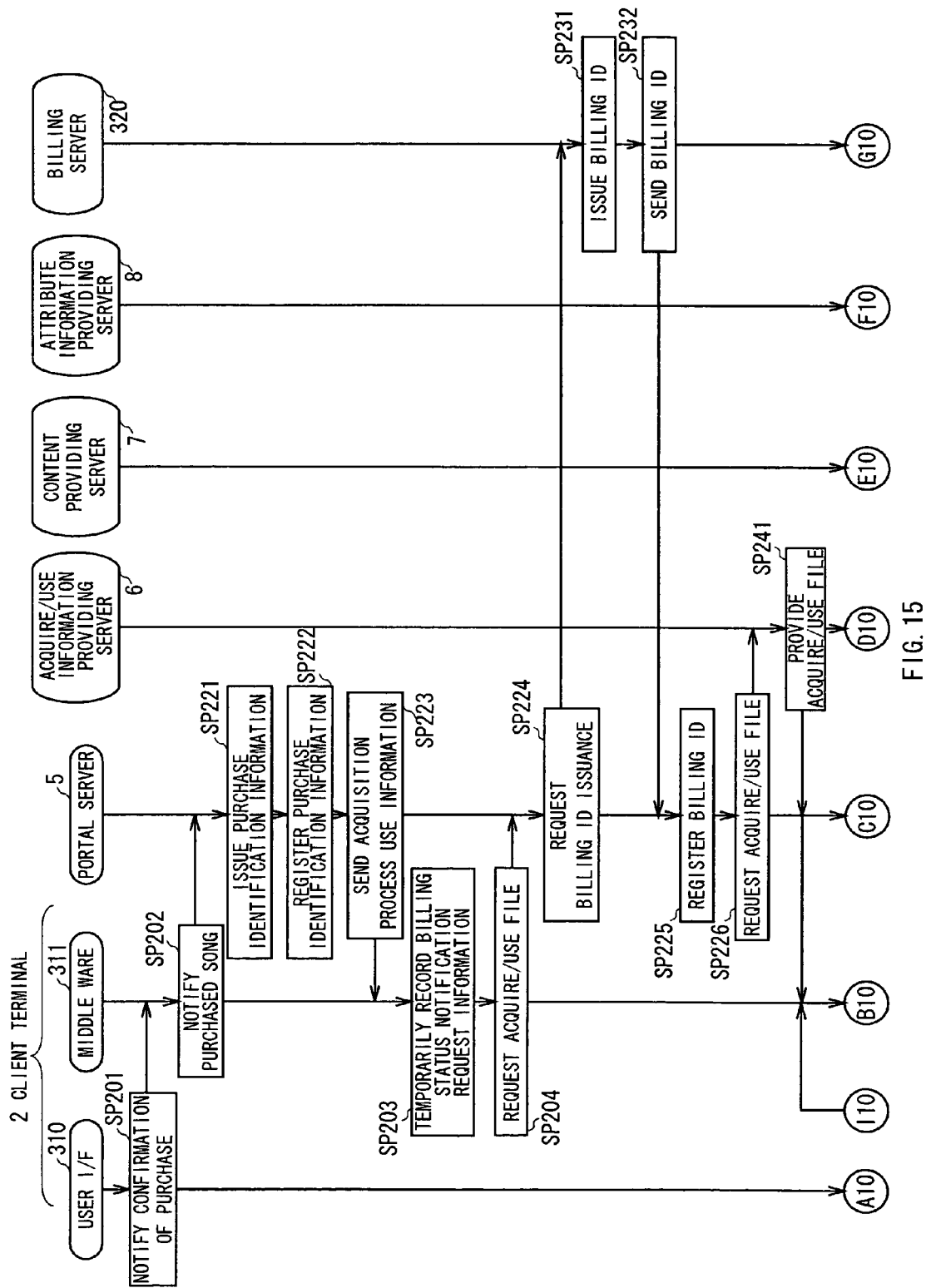
FIG. 15 is a sequential chart showing Song Purchasing Process Procedure (1)
Figure 16:
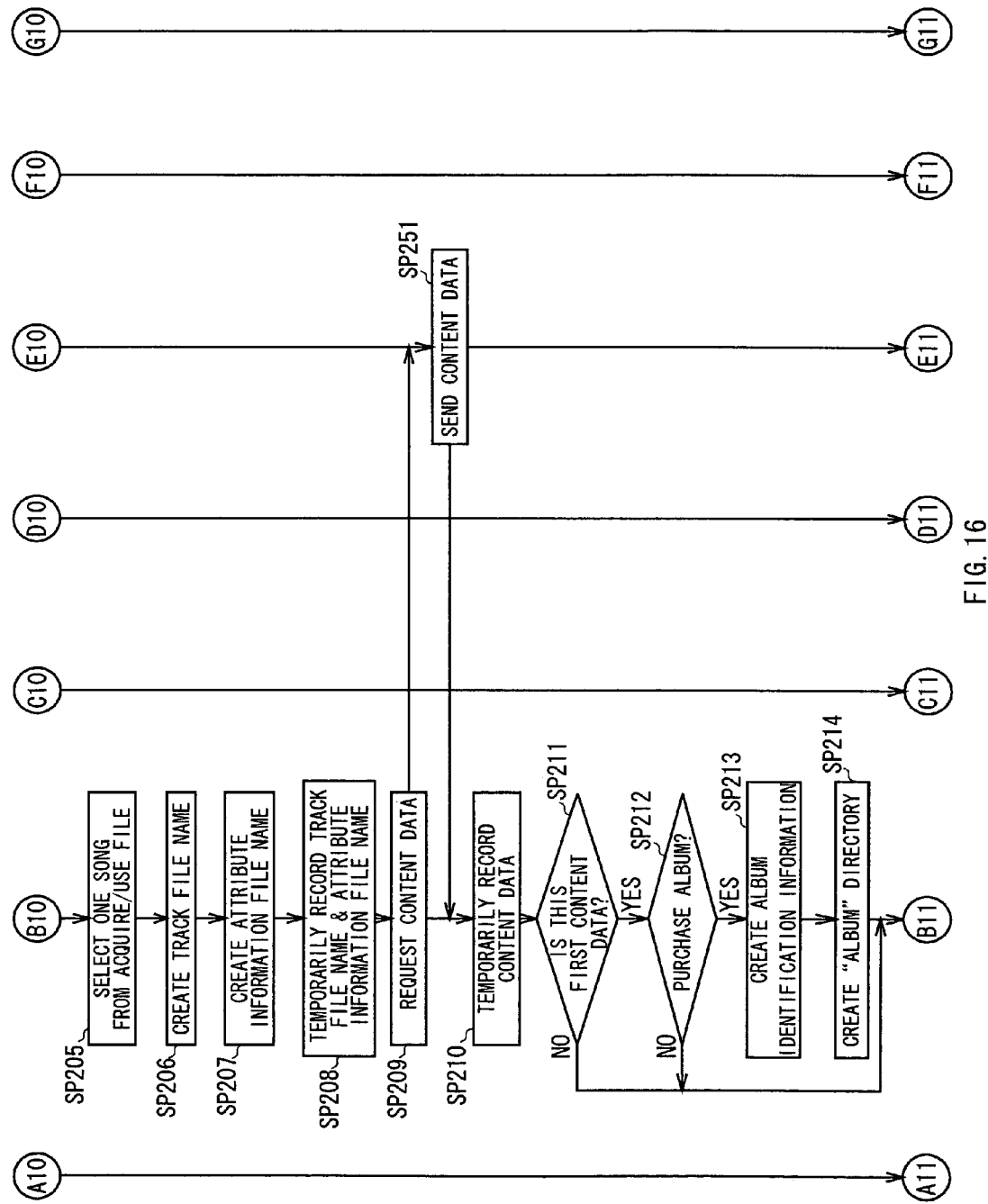
FIG. 16 is a sequential chart showing Song Purchasing Process Procedure (2)
Figure 17:
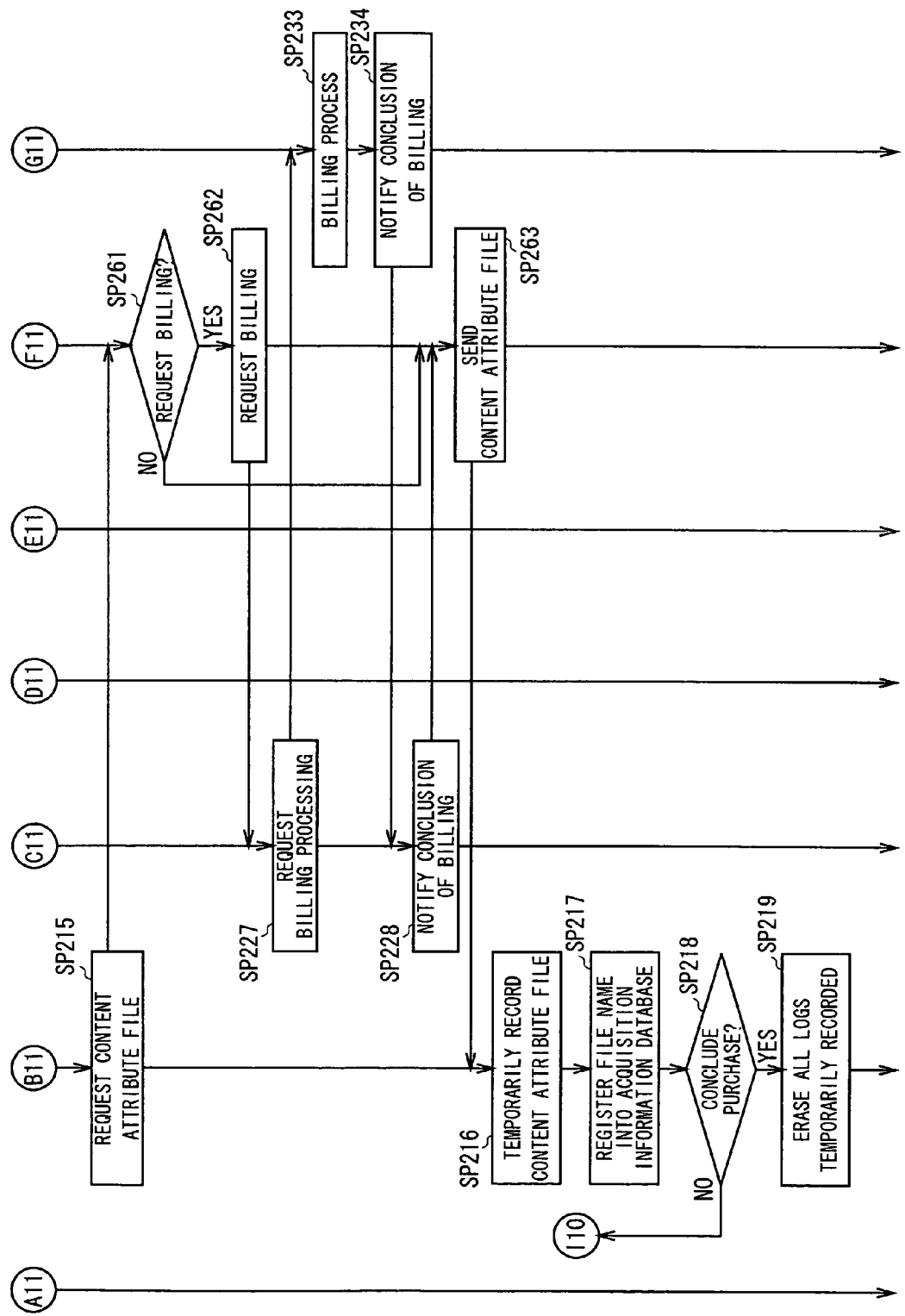
FIG. 17 is a sequential chart showing Song Purchasing Process Procedure (3)

An alternative procedure of the song purchase process that differs from the above-described procedure of the song purchase process will now be describe with reference to the sequential charts shown in FIGS. 15 to 17.

In this alternative procedure of the song purchase process, a CPU 100 of a client terminal 2 carries out the acquisition process according to a user interface 310, which corresponds to the XML browser 136 previously explained as a program module in reference to FIG. 12, and a middle ware 311 which corresponds to the HTTP message program 130, the communicator program 131, the copyright protection management module 133, the song purchasing playback module 135, the authentication library 138A, the hard disk content controller 137, the content data access module 140, and the database access module 139.

However, in the following description of this alternative procedure of the song purchase process, for convenience sake the user interface 310 and the middle ware 311 will be described as though they are a circuit block set up as hardware.

The controller portion 30 of the acquire/use information providing server 6 may create acquire/use information whenever a song purchase request is made by the user, instead of having the acquire/use information ready beforehand.

The controller portion 40 of the content providing server 7 is able to provide content data by preparing only an address to be accessed by the client terminal 2 for acquiring content data (hereinafter referred to as "content acquisition address"), without having to set up a content data providing homepage for providing content data.

The controller portion 40 is also able to provide content data without having the client terminal 2 send the content ID, by associating acquirable content date with the content acquisition address when providing content data.

Additionally, the controller portion 50 of the attribute information providing server 8 is able to provide the content attribute file 57 by preparing only an address to be accessed by the client terminal 2 for acquiring the content attribute file 57 (hereinafter referred to as "attribute file acquisition address"), without having to set up a attribute file providing homepage for providing the content attribute file 57.

Therefore, in the example used below to describe the alternative procedure for the song purchasing process, the controller portion 30 of the acquire/use information providing server 6 will create acquire/use information whenever a song purchase request is made by the user, and the content providing server 7 and the attribute file providing server 8 will provide the content data and the content attribute file 57 without setting up a content data providing homepage or a attribute file providing homepage.

Figures 18, 19:
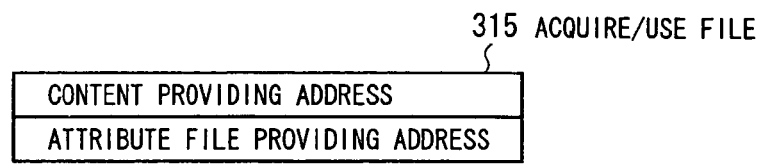
FIG. 18 is a schematic view showing the configuration of an acquire/use file.
FIG. 19 is a schematic view explaining logs indicating the process status of acquisition process.

Since the controller portion 30 of the acquire/use information providing server 6 is able to provide content data without having the content providing server 7 send the content ID to the client terminal 2, the controller portion 30 creates an acquire/use file 315 wherein the content acquisition address and attribute file acquisition address for respectively acquiring the content data and the content attribute file corresponding to the purchase-requested song is associated to each purchase-requested song and stored, with the exception of the content ID as shown in FIG. 18.

Also, by distributing a plurality of downloadable content data in the two modes of albums and singles, the controller portion 40 of the content providing server 7 allows users to arbitrarily select one or more songs by album or by singles, and purchase their content data.

Since the alternative procedure for the song purchasing process charges the user for each song purchase, the following description uses a newly introduced billing server 320, in addition to the client terminal 2, the portal server 5, the acquire/use information providing server 6, the content providing server 7, and the attribute file providing server 8.

Referring now to FIGS. 15 to 17, when commencing the acquisition process of the alternative procedure for the song purchase process, and after the user selects songs to be purchased either by album or by singles and such selection is confirmed, the user interface 310 of the client terminal 2 notifies the middle ware 311 that the songs to be purchased have been confirmed.

In step SP202, the middle ware 311 of the client terminal 2 creates the content ID of the content data corresponding to the song purchase-requested by the user, and a purchase song notification data storing the user ID and the password. The middle ware 311 then sends the purchase song notification data to the portal server 5 via the communication processing portion 114 and then the network interface 115.

In step SP221, the controller portion 20 of the portal server 5 receives the purchase song notification data sent by the client terminal 2 via the data communication processing portion 24. The controller portion 20, in response to receiving the purchase song notification data, issues purchase identification information which is able to specify the song purchase process, such as serial numbers, to the user that made the purchase request, and proceeds to step SP222.

In step SP222, the controller portion 20 identifies from the user database 23 personal information of the user that made the purchase request, based on the user ID and password stored in the purchase song notification data. The controller portion 20 then associates the purchase identification information, with the content ID corresponding to the purchase-requested song and stored in the purchase song notification data, to the identified personal information, and proceeds to step SP223.

In step SP223, the controlling portion 20 creates acquisition process use information to be used for the acquisition process in response to the user's song purchase request, and sends it to the client terminal 2 via the data communication processing portion 24.

The acquisition process use information includes such information as the acquire/use file request information to be used when acquiring the acquire/use file 315, and a billing status notification request information to be used to request billing status to the user when recovering from disruption in the acquisition process at the client terminal 2.

The acquire/use file request information includes such information as an address on the network 3 to be accessed by the client terminal 2 for acquiring the acquire/use file 315 (hereinafter referred to as "file acquisition address").

The billing status notification request information includes such information as an address to be accessed to request billing status notification to the user when the client terminal 2 recovers from a disruption in the acquisition process (hereinafter referred to as "retry address") and retries data acquisition for content data and the content attribution file 57, the purchase identification information issued in step SP221 to be presented by the other party (i.e. the portal server 5) when accessing the retry address, post data, and request codes (a code indicating request type).

In step 203, the middle ware 311 of the client terminal 2 receives acquisition process use information sent by the portal server 5 via the network interface 115 and then the communication processing portion 114.

The middle ware 311 then temporarily stores the billing status notification request information obtained based on the acquisition process use information as a first process intermediate information (hereinafter referred to as "first log") that indicates the intermediate status of the current acquisition process (i.e. indicating the start of the acquisition process) on to, for example, a hard disk of the hard disk drive 104, and proceeds to step SP204.

In step 204, the middle ware 311 of the client terminal 2 accesses the file acquisition address contained in the acquire/use file request information obtained based on the acquisition process use information, and requests the acquire/use file 315 to the portal server 5.

In step 224, the controller portion 20 of the portal server 5, in response to the request for the acquire/use file 315 by the client terminal 2, sends a billing ID issuance request data that requests issuance of a billing ID which is able to identify billing process to the user requesting song purchase, to the billing server 320 via the data communication processing portion 24.

In step 231, the controlling portion (not shown), composing for example a CPU, of the billing server 320, receives the billing ID issuance request data sent by the portal server 5 via the data communication processing portion (not shown). The controlling portion then issues a billing ID according to the billing ID issuance request data, and proceeds to step SP232.

In step SP232, the controlling portion of the billing server 320 sends the billing ID as a billing ID notification data to the portal server 5 via the data communication processing portion.

In step SP225, the controller portion 20 of the portal server 5 receives the billing ID notification data sent by the billing server 320 via the data communication processing portion 24. The controller portion 20 then associates the billing ID obtained based on the billing ID notification data to the purchase identification information already registered in step SP222, and additionally registers it into the user database 23.

The controller portion 20 also associates the billing status notification information, which indicates that the billing for the purchase of songs requested by the user is not yet billed, to the purchase identification information already registered in step SP222, and registers it into the user database 23, and then proceeds to step SP226.

In step SP226, the controller portion 20 creates a file request data, storing the content ID corresponding to the song purchase-requested by the user, that requests the user's client terminal 2 the acquire/use file 315 to be used to acquire content data and the content attribution file 57. The controlling portion 20 then sends the file request data to the acquire/use information providing server 6 via the data communication processing portion 24.

In step 241, the controlling portion 30 of the acquire/use information providing server 6 receives the file request data sent by the portal server 5 via the data communication processing portion 34. The controlling portion 30 then issues for instance the content acquisition addresses and the attribute file acquisition addresses in response to the file request data, and creates an acquire/use file 315 which stores the issued content acquisition addresses and the attribute file acquisition addresses associated with each song and in sequential order.

Additionally, while the acquire/use information providing server 6 is configured to issue the content acquisition addresses and the attribute file acquisition addresses in step SP241, the acquire/use information providing server 6 may be configured to create an acquire/use file 315 using content acquisition addresses issued by the content providing server 7 and attribute file acquisition addresses issued by the attribute information providing server 8.

The controller portion 30 then sends the acquire/use file 315 from the data communication processing portion 34 to the client terminal 2 via the portal server 5. Incidentally, the controller portion 30 of the acquire/use information providing server 6 shares as data providing use information the contents of acquire/use file 315, the content ID provided by the portal server 5 and corresponding to the song purchase-requested by the user, and the purchase identification information etc., with the content providing server 7 and the attribute information providing server 8.

In step SP205, the middle ware 311 of the client terminal 2 receives the acquire/use file 315, sent via the portal server 5 by the acquire/use information providing server 6, via the network interface 115 and then the communication processing portion 114, and temporarily records the acquire/use file 315 on for instance the RAM 103.

The middle ware 311 then selects according to the storing order one content acquiring address from, for example, one or more content acquisition addresses stored in the acquire/use file 315, and proceeds to step SP206.

In step SP206, the middle ware 311 creates a track file name which enables the "track" file to be identified when the content data, downloaded by accessing the selected content acquisition address, is recorded on the hard disk as a "track" file, and proceeds to step SP207.

In step SP207, the middle ware 311 creates an attribute information file name which enables the attribute information to be identified when the content attribute information, stored in the content attribute file 57 which is downloaded together with the content data corresponding to the content acquisition address selected in step SP206, is recorded on the hard disk as a file (hereinafter referred to as "attribute information file"), and proceeds to step SP208.

In step SP208, as shown in FIG. 19, the middle ware 311 temporarily records the track file name and the attribute information file name respectively created in steps SP206 and SP207 as a second process intermediate information (hereinafter referred to as "second log") that indicates the intermediate status of the current acquisition process onto, for example, a hard disk of the hard disk drive 104, and proceeds to step SP209.

In step SP209, the middle ware 311 of the client terminal 2 accesses the content acquisition address selected from the acquire/use file 315 in step SP205, and requests the content providing server 7 to download the content data.

When sharing the data providing use information with the acquire/use information providing server 6, the controller portion 40 of the content providing server 7 associates the content ID corresponding to the song purchase-requested by the user, to the content acquisition address described in the acquire/use file 315 already provided to the client terminal 2 used by the user.

Therefore, in step SP251, in response to the content data download request by the client terminal 2, the controller portion 40 of the content providing server 7 searches among the plurality of content data recorded in the content database 43 for the content data having the content ID already associated to the content acquisition address then accessed by the client terminal 2.

The controller portion 40 then sends the searched content data to the client terminal 2 via the data communication processing portion 44.

In step SP210, the middle ware 311 of the client terminal 2 receives the content data sent from the content providing server 7 via the network interface 115 and then the communication processing portion 114, while temporarily recording the content data as a "track" file having the track file name created in the aforementioned step SP206 onto the hard disk, and proceeds to step SP211.

Incidentally, the content data provided by the content providing server 7 stores, for instance, purchase format notification information indicating whether the content data is intended for purchasing by album or by singles, as attribute information of the content data in the header portion.

Thus, in step SP211, the middle ware 311 determines whether or not the content data temporarily recorded in the hard disk is the content data downloaded from the content providing server 7 at the start of the current acquisition process.

A positive result in step SP211 means that the content data temporarily stored in the hard disk is the content data downloaded from the content providing server 7 at the start of the current acquisition process, regardless of whether songs were purchase-requested by the user by album or by singles, and the middle ware 311 then proceeds to step SP212.

In step SP212, the middle ware 311 determines whether or not the content data is intended for purchasing by album, based on the purchase format notification information stored in the content data temporarily recorded in the hard disk.

A positive result in step SP212 means that a plurality of songs was purchase-requested by the user by the album in the current transaction (i.e. a plurality of songs contained in an album was collectively purchase-requested), and the middle ware 311 then proceeds to step SP213.

In step SP213, the middle ware 311 creates album identification information, in response to the song purchase request by album, which is able to specify the "track" file corresponding to the content data currently being acquired and the attribute information file of the content attribute file 57 which enables use of the content data, and identify the "album" directory to manage the "track" file and the attribute information file.

Incidentally, the album identification information is identification information created to allow identification only of the content data and the content attribute file 57 to be acquired now by the client terminal 2. In other words, even when for instance the same content data as the content data to be acquired from the content providing server 7 in the client terminal 2 is ripped from a CD etc. to the hard disk, the album identification information is able to identify only the content data acquired from the content providing server 7, and not the ripped content data.

As shown in FIG. 19, the middle ware 311 then temporarily records the album identification information as a third process intermediate information (hereinafter referred to as "third log") that indicates the intermediate status of the current acquisition process onto, for example, a hard disk of the hard disk drive 104, and proceeds to step SP214.

In step SP214, the middle ware 311 newly creates in the hard disk an "album" directory indicated by the album identification information created in step SP213, and proceeds to step SP215.

Meanwhile, a negative result in step SP211 means that the content data temporarily stored in the hard disk is content data subsequently downloaded from the content providing server 7 after the initial download, regardless of whether songs were purchase-requested by the user by album or by singles, and the middle ware 311 then proceeds to step SP215.

Also, a negative result in step SP212 means that one or a plurality of songs was purchase-requested by the user by singles.

Incidentally, whenever a plurality of songs is purchased requested by album, the middle ware 311 newly creates an "album" directory in the hard disk, as previously described in steps SP213 and SP214.

The hard disk, however, is already provided with a directory for managing the content data of songs by singles, and content attribute files 57 that enable use of such content data.

Incidentally, the middle ware 311 uses in advance any of the plurality of "album" directories among the hierarchically configured directories aforementioned in reference to FIG. 11, as a directory to group-manage the plurality of content data and content attribute files 57 of songs by singles.

Therefore, when the user purchase requests one or a plurality of songs by singles, producing a negative result in step SP212, the middle ware 311 does not create a directory to manage the content data and the content attribute files 57 corresponding to the singles, and proceeds to step SP215.

In step SP215, the middle ware 311 selects from the acquire/use file 315 an attribute file acquisition address corresponding to the content acquisition address selected in the aforementioned step SP205.

The middle ware 311 then accesses the selected attribute file acquisition address, and requests the attribute information providing server 8 to download the content attribute file 57.

By sharing the data providing use information with the acquire/use information providing server 6 and the content providing server 7, the attribute information providing server 8 retains a list including attribute file acquisition addresses to be provided to the client terminal 2 to acquire the content IDs of the content data and the acquire/use files 57 which allows such content data to be used.

Purchase identification information which enables specification of the song purchase process for the user attempting to acquire content data together with content attribute files 57 is now added to the list. In the list, content IDs and attribute file acquisition addresses etc. are associated with each song, and described according to the download sequence of the content data by the client terminal 2.

Additionally, among one or a plurality of attribute file acquisition addresses contained in the list, flags indicating that billing is requested to the user when the client terminal 2 accesses an attribute file acquisition address, are attached only to the first attribute file acquisition address (i.e. the attribute file acquisition address initially accessed to acquire the content attribute file 57 by the client terminal 2 when performing the acquisition process).

In other words, in this procedure for the song purchase process, regardless of whether the user purchase requests songs by the album or by singles, the billing process to the user is handled at the same time for all purchase-requested songs when the client terminal 2 used by the user requests download of the first content attribute file 57.

Therefore, in step SP261, the controlling portion 50 of the attribute information providing server 8 first determines whether or not to request billing to the user of the client terminal 2, based on the list, and in response to the download request of a content attribute file 57 by the client terminal 2.

A positive result in step SP261 means that the attribute file acquisition address currently being accessed by the client terminal 2 is the first attribute file acquisition address to be accessed by the client terminal 2 to acquire the first content attribute file 57 in the current procedure for song purchase process. The controlling portion 50 then proceeds to step SP262.

In step SP262, the controlling portion 50 stores the purchase identification information added to the list, while sending billing request data which requests the user of client terminal currently requesting download of the content attribute file 57 billing corresponding to the song purchase, to the portal server 5 via the data communication processing portion 54.

In step 227, the controller portion 20 of the portal server 5 receives the billing request data sent by the attribute information providing server 8 via the data communication processing portion 24. Based on the purchase identification information stored in the billing request data, the controller portion 20 identifies the personal information of the user currently requesting song purchase from the user database 23.

The controller portion 20 then stores the billing ID for the user who just requested song purchase, and the content IDs corresponding to all songs purchase-requested, both included in the identified personal information, while creating a billing process execution request data which requests the billing server 320 to execute the billing process. The controller portion 20 sends the billing process execution request data to billing server 320 via the data communication processing portion 24.

In step SP233, the controller portion of the billing server 320 receives the billing process execution request data sent by the portal server 5 via the data communication processing portion. Based on the billing ID and the content IDs stored in the billing process execution request data, the controller portion of the billing server 320 specifies various information including billing information to be used to process billing of the user who just requested the song purchase, and using the specified billing information etc. executes the billing process to the user.

When the billing process is concluded, the controller portion of the billing server 320 proceeds to step SP234 where the billing ID is stored, and a billing conclusion notification data which notifies the conclusion of the billing process is sent back to the portal server 5 via the data communication processing portion.

In step SP228, the controller portion 20 of the portal server 5 receives the billing conclusion notification data sent by the billing server 320 via the data communication processing portion 24.

Based on the billing ID stored in the billing conclusion notification data, the controller portion 20 identifies from the user database 23 the purchase identification information of the user, and updates the billing status notification information indicating pending of the billing, registered in correspondence to the purchase identification information, to a billing status notification information indicating that the billing process has been concluded, as notified by the billing conclusion notification data. The controller portion 20 then sends a billing conclusion data indicating that the billing process to the user has been concluded, to the attribute information providing server 8 via the data communication processing portion 24.

In step SP263, when receiving the billing conclusion data sent by the portal server 5 via the data communication processing portion 54, the, controller portion 50 of the attribute information providing server 8 acknowledges that the billing process for the user has been concluded.

The controller portion 50 creates a content attribute file 57 based on the content ID etc. already associated with the attribute file acquisition address accessed by the client terminal 2 in step SP215. The controller portion 50 sends the content attribute file 57 to the client terminal 2 via the data communication processing portion 54.

Incidentally, a negative result in the aforementioned step SP261 means that the attribute file acquisition address currently being accessed by the client terminal 2 is the attribute file acquisition address to be accessed by the client terminal 2 to acquire the second or subsequent content attribute file 57 in the current procedure for song purchase process.

Therefore, this negative result means that the billing process to the user is already concluded. The controlling portion 50 then proceeds to step SP263.

In step SP216, while receiving the content attribute file 57 sent by the attribute information providing server 8 via the network interface 115 and then the communication processing portion 114, the middle ware 311 of the client terminal 2 temporarily records the content attribute information stored in the content attribute file 57 as the attribute information file with the attribute information file name created in the aforementioned step SP207 onto the hard disk, and proceeds to step SP217.

In step SP217, when songs are purchase-requested by the user by album, the middle ware 311 registers the album identification information created in the aforementioned step SP213 into the acquisition information database already constructed in the hard disk.

The middle ware 311 also associates, as the lower tier information of the album identification information, the track file name for the content data downloaded in the aforementioned step SP210, and the attribute information file name for the content attribute file 57 downloaded in the aforementioned step SP216 to the album identification information registered into the acquisition information database, and registers such information into the acquisition information database.

Incidentally, once it registers the album identification information into the acquisition information database, the middle ware 311 then associates to the album identification information only the track file names and the attribute information file names of the downloaded content data and content attribute files 57 every time content data and content attribute files 57 are downloaded, and additionally registers them into the acquisition information database.

Conversely, when songs are purchase-requested by the user by singles in step SP217, the middle ware 311 associates as the lower tier information of identification information unique to the directory for managing singles already registered into the acquisition information database (hereinafter specifically referred to as "single identification information"), the track file name for the content data downloaded in the aforementioned step SP210, and the attribute information file name for the content attribute file 57 downloaded in the aforementioned step SP216, to the single identification information already registered into the acquisition information database, and registers such information into the acquisition information database.

The middle ware 311 then makes the "track" file and the attribute information file of the content data and content attribute file 57, respectively downloaded from the content providing server 7 and the attribute information providing server 8, manageable in either the "album" directory or a directory for managing singles in a structure similar to the directory structure aforementioned in reference to FIG. 11, and switches the record status of the content data and content attribute file 57 from temporary to permanent.

Consequently, the middle ware 311 specifies the content data and its corresponding content attribute file 57, respectively downloaded from the content providing server 7 and the attribute information providing server 8, using the album identification information or the single identification information, and makes the content data useable in accordance with the contents to its corresponding content attribute file 57, and proceeds to step SP218.

In step SP218, the middle ware 311 determines whether or not the content data and the corresponding content attribute file 57 corresponding to the purchase-requested songs were received in their entirety (i.e. whether all purchase-requested songs were purchased or not).

A negative result in step SP218 means that the user's purchase request was for a plurality of songs contained in an album, and not all of the content data and content attribute files 57 corresponding to the plurality of songs have been acquired yet. The middle ware 311 then returns to step SP205.

The middle ware 311 hereafter will cyclically repeat the processes in steps SP205 through SP218, to respectively download from the content providing server 7 and the attribute information providing server 8 content data and its corresponding content attribute files 57 for the songs purchased requested by the user in the sequence described in the acquire/use file 315, until a positive result in step SP218 is obtained.

Conversely, a positive result in step SP218 means that all of the content data and its corresponding content attribute files 57 for the songs purchased requested by the user have been downloaded, and registration into the acquisition information database has been concluded. The middle ware 311 then proceeds to step SP219.

In step SP219, after erasing the first to third logs temporarily recorded on, for instance, the hard disk during the execution of the acquisition process, the middle ware 311 concludes the acquisition process related to the purchase-requested songs.

Incidentally, in this embodiment, in a yet another procedure for the song purchase process, the portal server 5 may receive an acquire/use file, storing in its main section the data size information of the content data, from the acquire/use information providing server 6, and send it to the client terminal 2 via the proxy server 4, thereby ensuring transmission of the data size information of the content data to the client terminal 2, duplicating the result of the procedure for the song purchase process described above.

In this embodiment, the aforementioned first to third logs is used, in the event that the acquisition process is disrupted due to power loss etc. at the client terminal 2, to erase upon recovery the content data and the content attribute file 57 already acquired during the disrupted acquisition process from the content providing server 7 and the attribute information providing server 8 and recorded on the hard disk.

Thus, upon recovery following the disruption of the acquisition process, by erasing, according to the first to third logs, the content data and the content attribute file 57 already acquired during the disrupted acquisition process from the content providing server 7 and the attribute information providing server 8 and recorded on the hard disk, the client terminal 2 is enabled to restore the hard disk to the condition at the start of the disrupted acquisition, and retry data acquisition of the content data and the content attribute file 57 corresponding to the songs purchase-requested.

(3) Operation and Advantages

In the configuration provided above, a client terminal 2 of a data distribution system 1 communicates in compliance with HTTP via various servers on a network 3 including an attribute information providing server 6, and a proxy server 4, and then a song purchase is requested, requests the attribute information providing server 6 an acquire/use information to be used for acquiring content data corresponding to the purchase-requested song.

When the acquire/use information is requested by the client terminal 2, the attribute information providing server 6 stores the content ID and the data size information etc. of the content data requested by the client terminal 2 in an acquire/use file 35 in a main section wherein such information is not removed when the acquire/use file passes through the proxy server 4, and sends the acquire/use file 35 to the client terminal 2.

Upon receiving the acquire/use file 35 sent by the attribute information providing server 6, the client terminal 2 then compares the data size information contained in the main section of the acquire/use file 35 and corresponding to the purchase target content data, against the free space of the hard disk for storing the content data. Based on the result of this comparison, the client terminal 2 determines whether or not the hard disk can record all purchase target content data.

If the hard disk has enough free space to record all purchase target content data, the client terminal 2 requests a content providing server 7 to provide the purchase target content data according to the description in the acquire/use file 35, and then receives the purchase target content data sent from the content providing server 7 and records it onto the hard disk.

When the client terminal 2 finishes receiving the purchase target content data sent from the content providing server 7, the client terminal 2 compares the data size of the content data actually received, against the data size information corresponding to the content data stored in the main section of the acquire/use file 35. Based on the result of this comparison, the client terminal 2 determines whether or not the purchase target content data was properly received and the acquisition successful.

When the purchase target content data is successfully received, the client terminal 2 continues by requesting an attribute information providing server 8 to provide a content attribute file 47 corresponding to the content data, and then receives the content attribute file 57 sent from the attribute information providing server 8.

When the purchase target content data is not successfully received, the client terminal 2 once again requests the content providing server 7 to re-send the content data, thereby ensuring that the content data is successfully received.

In the above configuration, by having the client terminal 2 request the acquire/use information providing server 6 to provide the acquire/use information, and the acquire/use information providing server 6 having received the request store the content ID and the data size information of the content data requested by the client terminal 2 in an acquire/use file 35 in a main section wherein such information is not removed when the acquire/use file passes through the proxy server 4, and sends the acquire/use file 35 to the client terminal 2, the data size information of the content data sent by the attribute information providing server 6 via the proxy server 4 can be received by the client terminal 2 without the proxy server 4 removing the data size information, thereby achieving the data distribution system 1 that allows the client terminal 2 to securely receive data size information of content data.

Additionally, upon receiving the acquire/use file 35 sent by the acquire/use information providing server 6, by comparing the total data size information contained in the main section of the acquire/use file 35 and corresponding to the purchase target content data, against the free space of the hard disk to be used to record the purchase target content data, prior to the acquisition of the purchase target content data, the client terminal 2 is able to determine based on the comparison results whether or not the hard disk can record all purchase target content data, thereby preventing failure of content data acquisition due to lack of free hard disk space during the reception of the purchase target content data.

Thus, by confirming the hard disk free space before the acquisition of content data, in the event that the billing process has been concluded relatively early in the acquisition process, failure of content data acquisition due to lack of free hard disk space during the reception of the content data after the conclusion of the billing process can be avoided, thereby preventing losses to be inflicted on to the user.

Additionally, upon receiving the content data requested to the content providing server 7, the client terminal 2 compares the data size of the content data actually received, against the corresponding value of data size information stored in the main section of the acquire/use file 35. Based on the result of this comparison, the client terminal 2 determines whether or not the purchase target content data was properly received. If the content data was not successfully received, the client terminal 2 once again requests the content providing server 7 to re-send the content data, thereby ensuring that the content data is successfully received.

(4) Alternative Embodiments

While the embodiment described above provides that the client terminal 2 aborts the acquisition process when a lack of hard disk free space is detected during the acquisition process and therefore insufficient to record all purchase target content data, the prevent invention is not limited to this application, making it possible to have the client terminal 2, when a lack of hard disk free space is detected during the acquisition process and therefore insufficient to record all purchase target content data, have the user select content data to be erased from the hard disk, or alternately enable the CPU 100 to automatically select content data to be erased from the hard disk according to the order that they were recorded or an ascending order of playback frequency starting from the least frequent, allowing the acquisition process to continue without being aborted.

Also, while the content acquisition device according to the prevent invention is applied to the client terminal 2 described above in reference to FIGS. 1 to 19 in the above embodiment, the prevent invention is not limited to this application, and allows wide application using various other content acquisition devices such as personal computers, cellular phones, and PDAs (personal digital assistance), as long as they are capable of acquiring content data.

While hardware circuit blocks and program modules are implemented on the client terminal 2 in the embodiment described above, by implementing them onto various terminals other than the client terminal 2 such as cellular phones or personal computers, the same process can be achieved as with the client terminal 2, as long as the hardware circuit blocks and program modules are implemented on these terminals.

Additionally, in the embodiment described above, while the acquire/use information providing device according to the prevent invention is applied to the computer-configured acquire/use information providing server 6 described above in reference to FIGS. 1 to 19, the prevent invention is not limited to this application, and allows wide application using various other acquire/use information providing devices such as information processing devices including personal computers, cellular phones and PDAs, or a computer-configured content providing server 7, as long as these devices are capable of providing acquire/use information to be used to acquire content data.

Moreover, in the embodiment described above, while the content acquisition program according to the prevent invention is applied to a program module family composing the HTTP message program 130 already stored in the ROM 102 of the client terminal 2, the communicator program 131, the copyright protection information management module 133, the song purchase playback module 135, the XML browser 136, the hard disk content controller 137, the authentication library 138A, the data base access module 139, the content data access module 140, and the execution of the procedure of the song purchase process aforementioned in reference to FIGS. 13 to 17 is carried out according to the content acquisition program by the CPU 100 of client terminal 2, the prevent invention is not limited to this application, and allows application using other variously configured content acquisition programs, and may perform the acquisition process by installing a program storage media already containing the content acquisition program onto the client terminal 2.

Additionally, in the embodiment described above, while the acquire/use information providing program according to the prevent invention is applied to the acquire/use information providing program already installed in the ROM 31 of the acquire/use information providing server 6, and the controller portion 30 of the acquire/use information providing server 6 carries out the acquire/use information providing process (step SP31) of the song purchase process procedure aforementioned in reference to FIGS. 13 through 17 in accordance with the acquire/use information providing program, the prevent invention is not limited to this application, and allows application using other variously configured acquire/use information providing programs, and may perform the acquire/use information providing process by installing a program storage media already containing the acquire/use information providing program onto the acquire/use information providing server 6.

Moreover, in the embodiment described above, although the file request information sending means for sending to the acquire/use information providing device file request information, in response to the request of a content data, which requests an acquire/use file storing acquire/use information including the content data attribute information is applied to the CPU 100 of the client terminal 2, the communication processing 114 and the network interface 115, as aforementioned in reference to FIGS. 1 to 19, the prevent invention is not limited to this application, and allows application using other various attribute request information sending means such as a hardware circuit-configured file request information sending circuit or a wireless communication interface for sending file request information to the acquire/use information providing device.

Additionally, in the embodiment described above, while the information receiving means for receiving an acquire/use file, sent in response to the sent file request information by the acquire/use information providing device via a proxy device which undertakes some function of the content acquiring-side, which stores content identification information and attribute information of the content data in a portion wherein such information is not removed when the acquire/use file passes through the proxy device, is applied to the CPU 100 of the client terminal 2, the communication processing portion 114 and the network interface 115, as aforementioned in reference to FIGS. 1 to 19, the prevent invention is not limited to this application, and allows application using other various attribute information receiving means such as a hardware circuit-configured information receiving circuit or a wireless communication interface for receiving acquire/use information via a proxy device.

Moreover, in the embodiment described above, although the content request information sending means for sending to the content providing device content request information, in accordance with the acquire/use information contained in the acquire/use file, which requests content is applied to the CPU 100 of the client terminal 2, the communication processing portion 114 and the network interface 115, as aforementioned in reference to FIGS. 1 to 19, the prevent invention is not limited to this application, and allows application using other various notification request information sending means such as a hardware circuit-configured content request information sending circuit or a wireless communication interface for sending content request information.

Additionally, in the embodiment described above, although the content receiving means for receiving content data, sent by the content providing device content request information in response to the sending of the content request information, is applied to the CPU 100 of the client terminal 2, the communication processing portion 114 and the network interface 115, as aforementioned in reference to FIGS. 1 to 19, the prevent invention is not limited to this application, and allows application using other various notification information receiving means such as a hardware circuit-configured content receiving circuit or a wireless communication interface for receiving content data.

Moreover, in the embodiment described above, although the comparison means for comparing the data size information of the content data contained in the acquire/use file against the free space of the recording media to be used to record the received content data, is applied to the CPU 100 in the client terminal 2 aforementioned in reference to FIGS. 1 to 19 and which compares the data size information and the hard disk free space of the hard disk drive 104, the prevent invention is not limited to this application, and allows application using other various comparison means such as a hardware circuit-configured comparison circuit which compares the data size information of the content data contained in the acquire/use file against the free space of the recording media to be used to record the received content data.

Additionally, in the embodiment described above, although the notification means for notifying the lack of free space in the recording media for recording the content data, as determined by the comparison means, is applied to the CPU 100 of the client terminal 2, the display processing portion 111 and the display 107 aforementioned in reference to FIGS. 1 to 9, the prevent invention is not limited to this application, and allows application using other various notification means such as a hardware circuit-configured notification circuit, a speaker or a light emitting element which notifies the lack of free space.

Moreover, in the embodiment described above, although the determination means for determining, when reception of the content data is completed, whether or not the content data was successfully received by comparing the data size of the downloaded content data against the data size information of the content data in the acquire/use file, is applied to the CPU 100 of the client terminal 2 aforementioned in reference to FIGS. 1 to 19, the prevent invention is not limited to this application, and allows application using other various determination means such as a hardware circuit-configured determination circuit which determines whether or not the content data was successfully received by comparing the data size of the downloaded content data against the data size information of the content data in the acquire/use file, when reception of the content data is completed.

Additionally, in the embodiment described above, although the request information receiving means for receiving a file request information, sent from the content acquisition device in response to a content data request, and requesting an acquire/use file which stores content identification information and attribute information of the content data, is applied to the controller portion 30 and the data communication processing portion 34 of the acquire/use information providing server 6, aforementioned in reference to FIGS. 1 to 19, the prevent invention is not limited to this application, and allows application using other various request information receiving means such as a hardware circuit-configured request information receiving circuit or a wireless communication interface for receiving file request information.

Moreover, in the embodiment described above, although the information sending means for sending, via a proxy device undertakes some function of the content acquiring-side, an acquire/use file which stores content identification information and attribute information of the content data in a portion where such information is not removed when the acquire/use file passes through the proxy device, in response to a file request information received from the request information receiving means, is applied to the controller portion 30 and the data communication processing portion 34 of the acquire/use information providing server 6, aforementioned in reference to FIGS. 1 to 19, the prevent invention is not limited to this application, and allows application using other various information sending means such as a hardware circuit-configured information sending circuit or a wireless communication interface which sends the acquire/use file to the content acquisition device via the proxy device.

INDUSTRIAL APPLICABILITY

The present invention is applicable to data distribution systems constructed from personal computers communication-linked via the Internet or a wireless LAN (local area network), and servers such as a computer-configured acquire/use information providing server.

EXPLANATION OF REFERENCE NUMERALS

1 . . . DATA DISTRIBUTION SYSTEM, 2 . . . CLIENT TERMINAL, 3 . . . NETWORK, 4 . . . PROXY SERVER, 5 . . . PORTAL SERVER, 6 . . . ACQUIRE/USE INFORMATION PROVIDING SERVER, 7 . . . CONTENT PROVIDING SERVER, 30 . . . CONTROLLER PORTION, 34 . . . DATA COMMUNICATION PROCESSING PORTION, 35 . . . ACQUIRE/USE FILE, 36 . . . DATA SIZE LIST, 100 . . . CPU, 102 . . . ROM, 104 . . . HARD DISK DRIVE, 107 . . . DISPLAY, 111 . . . DISPLAY PROCESSING PORTION, 114 . . . COMMUNICATION PROCESSING PORTION, 115 . . . NETWORK INTERFACE, 130 . . . HTTP MESSAGE PROGRAM, 131 . . . COMMUNICATOR PROGRAM, 113 . . . COPYRIGHT PROTECTION MANAGEMENT MODULE, 135 . . . SONG PURCHASE PLAYBACK MODULE, 136 . . . XML BROWSER, 137 . . . HARD DISK CONTENT CONTROLLER, 138A . . . AUTHENTICATION LIBRARY, 139 . . . DATABASE ACCESS MODULE, 140 . . . CONTENT DATA ACCESS MODULE

The invention claimed is:

1. A content acquisition method comprising:
sending file request information that requests an acquire/use file storing acquire/use content identification information and content attribute information, to an acquire/use information providing device in response to a request for content data;
receiving via a proxy device said acquire/use file that stores the content identification information and said attribute information of said content data sent by said acquire/use information providing device in response to the content data request, said content identification information and content attribute information are stored in a data area such that no information is removed from said content identification information and content attribute information when the acquire/use file passes through said proxy device, said receiving via a proxy device including receiving said acquire/use file sent in compliance with HTTP (Hyper Text Transfer Protocol) from said acquire/use information providing device, said proxy device complying with an HTTP standard except that a file size is never removed from the acquire/use file when passing the acquire/use file through the proxy device;
sending content request information requesting said content data from a content providing device according to said acquire/use information contained in said acquire/use file; and
receiving said content data sent by said content providing device in response to the transmission of said content request information.

2. The content acquisition method according to claim 1, wherein the attribute information corresponding to said content data includes data size information of said content data.

3. The content acquisition method according to claim 2, further comprising:
comparing said data size information of said content data contained in said acquire/use file with a free space of a recording media to be used to record said content data upon reception; and
notifying a lack of said free space in said recording media for storing the content data if said free space in said recording media is insufficient.

4. The content acquisition method according to claim 2, further comprising:
comparing the data size of received content data with said data size information of said content data contained in said acquire/use file, and determining whether the content data has been successfully received.

5. The content acquisition method according to claim 2, wherein:
said acquire/use file stores said content identification information and said attribute information of said content data in its main section.

6. The content acquisition method according to claim 1, wherein the content data is an audio file.

7. The content acquisition method according to claim 1, wherein the content data is a music file.

8. An acquire/use information providing method comprising:
receiving file request information requesting an acquire/use file that stores acquire/use content identification information and content attribute information of content data, sent by a content acquisition device in response to a request for the content data by a content data acquisition device; and
sending via a proxy device to said content acquisition device, said acquire/use file that stores content data content identification information and the attribute information of the content, said content identification information and content attribute information are stored in a data area such that no information is removed from said content identification information and content attribute information when the acquire/use file passes through said proxy device, in response to the received file request information, said sending including sending said acquire/use file in compliance with HTTP (Hyper Text Transfer Protocol), said proxy device complying with an HTTP standard except that a file size is never removed from the acquire/use file when passing the acquire/use file through the proxy device.

9. The acquire/use information providing method according to claim 8, wherein said attribute information corresponding to said content data includes data size information of said content data.

10. The acquire/use information providing method according to claim 9, wherein said acquire/use file stores said content identification information and said data size information of said content data in its main section.

11. A content acquisition device comprising:
a file request information sending unit configured to send file request information that requests an acquire/use file storing acquire/use content identification information and content attribute information, to an acquire/use information providing device in response to a request for content data;
an information receiving unit configured to receive via a proxy device said acquire/use file that stores the content identification information and said attribute information of said content data sent by said acquire/use information providing device in response to the content data request, said content identification information and content attribute information are stored in a data area such that no information is removed from said content identification information and content attribute information when the acquire/use file passes through said proxy device, said information receiving unit configured to receive said acquire/use file sent in compliance with HTTP (Hyper Text Transfer Protocol) from said acquire/use information providing device, said proxy device complying with an HTTP standard except that a file size is never removed from the acquire/use file when passing the acquire/use file through the proxy device;

a content request information sending unit configured to send content request information requesting said content data from a content providing device according to said acquire/use information contained in said acquire/use file; and a content receiving unit configured to receive said content data sent by said content providing device in response to the transmission of said content request information.

12. The content acquisition device according to claim 11, wherein the attribute information corresponding to said content data includes data size information of said content data.

13. The content acquisition device according to claim 12, further comprising:

a comparison unit configured to compare the data size information of said content data contained in said acquire/use file with a free space of a recording media to be used to record said content data upon reception; and a notification unit configured to notify a lack of said free space in said recording media for storing the content data if said free space in said recording media is insufficient.

14. The content acquisition device according to claim 12, further comprising:

a determination unit configured to compare the data size of received content data with said data size information of said content data contained in said acquire/use file, and determine whether the content data has been successfully received.

15. The content acquisition device according to claim 12, wherein:

said acquire/use file stores said content identification information and said attribute information of said content data in its main section.

16. An acquire/use information providing device comprising:

a request information receiving unit configured to request an acquire/use file that stores acquire/use content identification information and content attribute information of content data, sent by a content acquisition device in response to a request for the content data by a content data acquisition device; and an information sending unit configured to send via a proxy device to said content acquisition device, said acquire/use file that stores content data content identification information and the attribute information of the content, said content identification information and content attribute information are stored in a data area such that no information is removed from said content identification information and content attribute information when the acquire/use file passes through said proxy device, said information sending unit configured to send the acquire/use file in compliance with HTTP (Hyper Text Transfer Protocol), said proxy device complying with an HTTP standard except that a file size is never removed from the acquire/use file when passing the acquire/use file through the proxy device.

17. The acquire/use information providing device according to claim 16, wherein the attribute information corresponding to said content includes data size information of said content data.

18. The acquire/use information providing device according to claim 16, wherein said acquire/use file stores said content identification information and said data size information of said content data in its main section.

19. A non-transitory computer readable recording medium storing a program, which when executed by a processor, causes the processor to execute a procedure comprising:

sending file request information that requests an acquire/use file storing acquire/use content identification information and content attribute information, to an acquire/use information providing device in response to a request for content data;

receiving via a proxy device said acquire/use file that stores the content identification information and said attribute information of said content data sent by said acquire/use information providing device in response to the content data request, said content identification information and content attribute information are stored in a data area such that no information is removed from said content identification information and content attribute information when the acquire/use file passes through said proxy device, said receiving via a proxy device including receiving said acquire/use file sent in compliance with HTTP (Hyper Text Transfer Protocol) from said acquire/use information providing device, said proxy device complying with an HTTP standard except that a file size is never removed from the acquire/use file when passing the acquire/use file through the proxy device;

sending content request information requesting said content data from a content providing device according to said acquire/use information contained in said acquire/use file; and receiving said content data sent by said content providing device in response to the transmission of said content request information.

20. A non-transitory computer readable recording medium storing a program which when executed by a processor causes the processor to execute a procedure comprising:

receiving file request information requesting an acquire/use file that stores acquire/use content identification information and content attribute information of content data, sent by a content acquisition device in response to a request for the content data by a content data acquisition device; and sending via a proxy device to said content acquisition device, said acquire/use file that stores content data content identification information and the attribute information of the content, said content identification information and content attribute information are stored in a data area such that no information is removed from said content identification information and content attribute information when the acquire/use file passes through said proxy device, in response to the received file request information, said sending including sending said acquire/use file in compliance with HTTP (Hyper Text Transfer Protocol), said proxy device complying with an HTTP standard except that a file size is never removed from the acquire/use file when passing the acquire/use file through the proxy device.

* * * * *